(12) United States Patent
Komura et al.

(10) Patent No.: US 7,821,732 B2
(45) Date of Patent: Oct. 26, 2010

(54) THERMALLY ASSISTED MAGNETIC HEAD HAVING AN ASYMMETRIC PLASMON ANTENNA AND MANUFACTURING METHOD THEREOF

(75) Inventors: Eiji Komura, Tokyo (JP); Seiichi Takayama, Tokyo (JP); Satoshi Tomikawa, Tokyo (JP); Kosuke Tanaka, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 184 days.

(21) Appl. No.: 12/237,810

(22) Filed: Sep. 25, 2008

(65) Prior Publication Data

US 2010/0073802 A1 Mar. 25, 2010

(51) Int. Cl.
*G11B 5/02* (2006.01)
(52) U.S. Cl. .............. 360/59; 369/13.33; 369/13.13
(58) Field of Classification Search .............. 369/13.33, 369/13.13, 13.32, 112.09, 112.14, 112.21, 369/112.27; 360/59; 385/31, 88–94, 129
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,518,815 B2 * | 4/2009 | Rottmayer et al. | 360/59 |
| 7,529,158 B2 * | 5/2009 | Matsumoto et al. | 369/13.33 |
| 2003/0066944 A1 | 4/2003 | Matsumoto et al. | |
| 2003/0223316 A1 * | 12/2003 | Saga et al. | 369/13.33 |
| 2006/0187564 A1 | 8/2006 | Sato et al. | |
| 2007/0041119 A1 * | 2/2007 | Matsumoto et al. | 360/59 |
| 2007/0096854 A1 * | 5/2007 | Matsumoto et al. | 335/208 |
| 2007/0286031 A1 * | 12/2007 | Matsumoto | 369/13.13 |
| 2008/0191122 A1 * | 8/2008 | Hongo et al. | 250/201.5 |
| 2010/0046331 A1 * | 2/2010 | Takayama et al. | 369/13.33 |
| 2010/0079895 A1 * | 4/2010 | Takayama et al. | 360/59 |
| 2010/0103553 A1 * | 4/2010 | Shimazawa et al. | 360/59 |
| 2010/0118431 A1 * | 5/2010 | Tomikawa et al. | 360/59 |

FOREIGN PATENT DOCUMENTS

| | | |
|---|---|---|
| JP | A-2001-255254 | 9/2001 |
| JP | A-2003-114184 | 4/2003 |
| JP | A-2006-185548 | 7/2006 |
| JP | A-2007-154244 | 6/2007 |
| JP | A-2008-059691 | 3/2008 |

\* cited by examiner

*Primary Examiner*—Tan X Dinh
(74) *Attorney, Agent, or Firm*—Oliff & Berridge, PLC

(57) ABSTRACT

A thermally assisted magnetic head according to the present invention includes: a medium-facing surface, a main magnetic pole provided on the medium-facing surface, and a plasmon antenna provided on the medium-facing surface in the vicinity of the main magnetic pole, wherein the plasmon antenna is shaped as a triangular flat plate having first, second and third corners, such that the distance from the first corner to the main magnetic pole is shorter than the distance from the second corner to the main magnetic pole and the distance from the third corner to the main magnetic pole, and the interior angle α of the first corner, the interior angle β of the second corner and the interior angle γ of the third corner satisfy relationships α<β, α<γ and β≠γ.

7 Claims, 35 Drawing Sheets

COMPARATIVE EXAMPLES
1,3,5,6,7,8,9,10

EXAMPLES
1~24

COMPARATIVE EXAMPLES
2,4

*Fig.19*

|  | α (deg) | β (deg) | γ (deg) | SIDE AB (nm) | SURFACE AREA | MATERIAL |
|---|---|---|---|---|---|---|
| EXAMPLE 1 | 30 | 70 | 80 | 150 | $S_1$ | Au |
| EXAMPLE 2 | 30 | 65 | 85 | 150 | $S_2$ | Au |
| COMPARATIVE EXAMPLE 1 | 30 | 75 | 75 | 150 | $C_1$ | Au |
| COMPARATIVE EXAMPLE 2 | 30 | 75 | 75 | 144 | $C_2(=S_2)$ | Au |

Fig.20A

COMPARATIVE EXAMPLE 1

| WAVELENGTH (nm) | NEAR-FIELD LIGHT EMISSION INTENSITY (a.u.) | | |
|---|---|---|---|
| | VERTEX A | VERTEX B | VERTEX C |
| 500 | 1.04 | 4.96 | 4.96 |
| 600 | | | |
| 650 | 465 | 22.4 | 22.4 |
| 700 | 674 | 141 | 141 |
| 800 | 1770 | 500 | 500 |
| 900 | 279 | 56.3 | 56.3 |

Fig.20B

COMPARATIVE EXAMPLE 1

| WAVELENGTH (nm) | NEAR-FIELD LIGHT EMISSION INTENSITY (a.u.) | | |
|---|---|---|---|
| | VERTEX A | VERTEX B | VERTEX C |
| 500 | 0.2 | 1 | 1 |
| 600 | | | |
| 650 | 20.8 | 1 | 1 |
| 700 | 4.8 | 1 | 1 |
| 800 | 3.5 | 1 | 1 |
| 900 | 5.0 | 1 | 1 |

Fig.22A

EXAMPLE 1

| WAVELENGTH (nm) | NEAR-FIELD LIGHT EMISSION INTENSITY (a.u.) | | |
|---|---|---|---|
| | VERTEX A | VERTEX B | VERTEX C |
| 500 | 0.654 | 4.09 | 6.01 |
| 600 | 239 | 25.8 | 20.9 |
| 650 | 293 | 19.4 | 13 |
| 700 | 1420 | 29.7 | 5.7 |
| 800 | 3380 | 272 | 241 |
| 900 | 198 | 40.5 | 36.6 |

Fig.22B

EXAMPLE 1

| WAVELENGTH (nm) | NEAR-FIELD LIGHT EMISSION INTENSITY (a.u.) | | |
|---|---|---|---|
| | VERTEX A | VERTEX B | VERTEX C |
| 500 | 0.2 | 1 | 1.5 |
| 600 | 9.3 | 1 | 0.8 |
| 650 | 15.1 | 1 | 0.7 |
| 700 | 47.8 | 1 | 0.2 |
| 800 | 12.4 | 1 | 0.9 |
| 900 | 4.9 | 1 | 0.9 |

Fig.24A

EXAMPLE 2

| WAVELENGTH (nm) | NEAR-FIELD LIGHT EMISSION INTENSITY (a.u.) | | |
|---|---|---|---|
| | VERTEX A | VERTEX B | VERTEX C |
| 500 | 1.35 | 1.53 | 5.47 |
| 600 | 291 | 26.8 | 44.3 |
| 650 | 863 | 37.1 | 35.6 |
| 700 | 2300 | 22.7 | 27.9 |
| 800 | 5700 | 414 | 382 |
| 900 | 321 | 53.6 | 51.1 |

Fig.24B

EXAMPLE 2

| WAVELENGTH (nm) | NEAR-FIELD LIGHT EMISSION INTENSITY (a.u.) | | |
|---|---|---|---|
| | VERTEX A | VERTEX B | VERTEX C |
| 500 | 0.9 | 1 | 3.6 |
| 600 | 10.9 | 1 | 1.7 |
| 650 | 23.3 | 1 | 1.0 |
| 700 | 101.3 | 1 | 1.2 |
| 800 | 13.8 | 1 | 0.9 |
| 900 | 6.0 | 1 | 1.0 |

Fig.26A

COMPARATIVE EXAMPLE 2

| WAVELENGTH (nm) | NEAR-FIELD LIGHT EMISSION INTENSITY (a.u.) | | |
|---|---|---|---|
| | VERTEX A | VERTEX B | VERTEX C |
| 500 | 2.05 | 4.65 | 4.65 |
| 600 | 288 | 33.5 | 33.5 |
| 650 | 423 | 19.4 | 19.4 |
| 700 | 666 | 24.1 | 24.1 |
| 800 | 1430 | 224 | 224 |
| 900 | 177 | 43.2 | 43.2 |

Fig.26B

COMPARATIVE EXAMPLE 2

| WAVELENGTH (nm) | NEAR-FIELD LIGHT EMISSION INTENSITY (a.u.) | | |
|---|---|---|---|
| | VERTEX A | VERTEX B | VERTEX C |
| 500 | 0.4 | 1 | 1 |
| 600 | 8.6 | 1 | 1 |
| 650 | 21.8 | 1 | 1 |
| 700 | 27.6 | 1 | 1 |
| 800 | 6.4 | 1 | 1 |
| 900 | 4.1 | 1 | 1 |

Fig.29

|  | α (deg) | β (deg) | γ (deg) | SIDE AB (nm) | SURFACE AREA | MATERIAL |
|---|---|---|---|---|---|---|
| EXAMPLE 3 | 30 | 70 | 80 | 150 | $S_3$ | Ag |
| EXAMPLE 4 | 30 | 65 | 85 | 150 | $S_4$ | Ag |
| COMPARATIVE EXAMPLE 3 | 30 | 75 | 75 | 150 | $C_3$ | Ag |
| COMPARATIVE EXAMPLE 4 | 30 | 75 | 75 | 144 | $C_4(=S_4)$ | Ag |

Fig.31

| | α (deg) | β (deg) | γ (deg) | SIDE AB (nm) | MATERIAL | NEAR-FIELD LIGHT EMISSION INTENSITY $((V/m)^2)$ |
|---|---|---|---|---|---|---|
| COMPARATIVE EXAMPLE 5 | 20 | 80 | 80 | 150 | Au | 2150 |
| EXAMPLE 5 | 20 | 75 | 85 | 150 | Au | 3530 |
| EXAMPLE 6 | 20 | 70 | 90 | 150 | Au | 6710 |
| COMPARATIVE EXAMPLE 1 | 30 | 75 | 75 | 150 | Au | 1770 |
| EXAMPLE 1 | 30 | 70 | 80 | 150 | Au | 3380 |
| EXAMPLE 2 | 30 | 65 | 85 | 150 | Au | 5700 |
| EXAMPLE 7 | 30 | 60 | 90 | 150 | Au | 5890 |

Fig.32

| | α (deg) | β (deg) | γ (deg) | SIDE AB (nm) | MATERIAL | NEAR-FIELD LIGHT EMISSION INTENSITY $((V/m)^2)$ |
|---|---|---|---|---|---|---|
| COMPARATIVE EXAMPLE 6 | 45 | 67.5 | 67.5 | 150 | Au | 650 |
| EXAMPLE 8 | 45 | 65 | 70 | 150 | Au | 1080 |
| EXAMPLE 9 | 45 | 60 | 75 | 150 | Au | 3440 |
| EXAMPLE 10 | 45 | 55 | 80 | 150 | Au | 4470 |
| EXAMPLE 11 | 45 | 50 | 85 | 150 | Au | 2920 |
| EXAMPLE 12 | 45 | 45 | 90 | 150 | Au | 1030 |
| COMPARATIVE EXAMPLE 7 | 55 | 62.5 | 62.5 | 150 | Au | 1050 |
| EXAMPLE 13 | 55 | 60 | 65 | 150 | Au | 2100 |
| EXAMPLE 14 | 55 | 55 | 70 | 150 | Au | 2700 |

Fig.33

| | α (deg) | β (deg) | γ (deg) | SIDE AB (nm) | MATERIAL | NEAR-FIELD LIGHT EMISSION INTENSITY $((V/m)^2)$ |
|---|---|---|---|---|---|---|
| COMPARATIVE EXAMPLE 8 | 20 | 80 | 80 | 150 | Ag | 2710 |
| EXAMPLE 15 | 20 | 75 | 85 | 150 | Ag | 5940 |
| EXAMPLE 6 | 20 | 70 | 90 | 150 | Ag | 5160 |
| COMPARATIVE EXAMPLE 3 | 30 | 75 | 75 | 150 | Ag | 2160 |
| EXAMPLE 3 | 30 | 70 | 80 | 150 | Ag | 4690 |
| EXAMPLE 4 | 30 | 65 | 85 | 150 | Ag | 4380 |
| EXAMPLE 17 | 30 | 60 | 90 | 150 | Ag | 2500 |

Fig.34

| | α (deg) | β (deg) | γ (deg) | SIDE AB (nm) | MATERIAL | NEAR-FIELD LIGHT EMISSION INTENSITY ((V/m)$^2$) |
|---|---|---|---|---|---|---|
| COMPARATIVE EXAMPLE 9 | 45 | 67.5 | 67.5 | 150 | Ag | 700 |
| EXAMPLE 18 | 45 | 65 | 70 | 150 | Ag | 1890 |
| EXAMPLE 19 | 45 | 60 | 75 | 150 | Ag | 3890 |
| EXAMPLE 20 | 45 | 55 | 80 | 150 | Ag | 3530 |
| EXAMPLE 21 | 45 | 50 | 85 | 150 | Ag | 1830 |
| EXAMPLE 22 | 45 | 45 | 90 | 150 | Ag | 750 |
| COMPARATIVE EXAMPLE 10 | 55 | 62.5 | 62.5 | 150 | Ag | 1600 |
| EXAMPLE 23 | 55 | 60 | 65 | 150 | Ag | 2650 |
| EXAMPLE 24 | 55 | 55 | 70 | 150 | Ag | 3050 |

THERMALLY ASSISTED MAGNETIC HEAD HAVING AN ASYMMETRIC PLASMON ANTENNA AND MANUFACTURING METHOD THEREOF

BACKGROUND OF THE INVENTION

1. Field of the Invention

The present invention relates to a thermally assisted magnetic head having an asymmetric plasmon antenna, a head gimbal assembly and a hard disk drive, and to a method for manufacturing the thermally assisted magnetic head having an asymmetric plasmon antenna.

2. Related Background Art

Thin-film magnetic heads must deliver ever greater performance to cope with higher recording densities in hard disk drives. Widely used thin-film magnetic heads include composite thin-film magnetic heads having a multilayer structure comprising, for instance, a magnetic sensing element such as a magnetoresistive (MR) effect element and an electromagnetic coil element. These elements write and read data signals to/from a magnetic disk, which is a magnetic recording medium.

The magnetic recording medium is normally a so-called discontinuous medium having a structure in which magnetic microparticles are aggregated, each magnetic microparticle constituting a single magnetic domain structure. One recording bit comprises a plurality of magnetic microparticles. In order to enhance recording density, therefore, the magnetic microparticles must be made smaller, and the irregularities at the boundaries between recording bits must be reduced. Reducing the size of magnetic microparticles, however, is problematic in that reduction in particle volume is accompanied by a drop in magnetization thermal stability.

The factor $K_U V/k_B T$ is an indicator of magnetization thermal stability. $K_U$ is the magnetic anisotropy energy of the magnetic microparticles, V is the volume of one magnetic microparticle, $k_B$ is the Boltzmann constant, and T is the absolute temperature. Making the magnetic microparticles smaller implies reducing their volume V. In turn, this makes $K_U V/k_B T$ smaller, thereby impairing thermal stability. An approach for addressing this problem is increasing $K_U$ commensurately, but doing so results in a larger coercitivity of the recording medium. In contrast, the strength of the write magnetic field afforded by the magnetic head is largely determined by the saturation flux density of the soft magnetic material that makes up the magnetic poles in the head. Thus, writing may become impossible when the coercivity exceeds a tolerance that is determined on the basis of the limits of the strength of the writing magnetic field.

Proposed methods for solving the problem of magnetization thermal stability include using a magnetic material having a large $K_U$, and so-called thermally assisted magnetic recording, in which writing is carried out by lowering coercitivity through heating of the recording medium immediately before application a writing magnetic field. Thermally assisted magnetic recording can be broadly classified into magnetic dominant recording and optical dominant recording. In magnetic dominant recording, writing is governed by an electromagnetic coil element, and the radiation diameter of light is larger than the track width (recording width). In optical dominant recording, on the other hand, writing is governed by a light-radiating section, and the radiation diameter of light is approximately equal to the track width (recording width). That is, magnetic field determines the spatial resolution in magnetic dominant recording, whereas light determines the spatial resolution in optical dominant recording.

Japanese Patent Application Laid-open Nos. 2001-255254 and 2003-114184 disclose thermally-assisted magnetic heads in which an electroconductive plate-shaped plasmon antenna is disposed on a medium-facing surface, and in which near-field light is generated by irradiating light onto the plasmon antenna from an opposite side of the magnetic recording medium. The plasmon antenna is formed in such a manner that a corner at one end of the plasmon antenna is located close to a main magnetic pole. Near-field light is generated mainly around this corner.

In the above conventional plasmon antennas, however, near-field light is generated not only at the corner on one end of the plasmon antenna, but also at other corners of other ends. As a result, the intensity of the near-field light generated at the corner on one end of the plasmon antenna may be insufficient, while near-field light generated at other corners on other ends of the plasmon antenna may heat up areas around the recording region of the recording medium, thereby making side-erasing likelier to occur.

SUMMARY OF THE INVENTION

In the light of the above problems, it is an object of the present invention to provide a thermally assisted magnetic head, a head gimbal assembly and a hard disk drive, the thermally assisted magnetic head comprising a plasmon antenna in which the intensity of near-field light generated at a corner located close to a main magnetic pole is strongest, while the intensity of near-field light generated at other corners is relatively weak, and to provide a method for manufacturing such a thermally assisted magnetic head.

The thermally assisted magnetic head according to the present invention comprises a medium-facing surface, a main magnetic pole provided on the medium-facing surface, and a plasmon antenna provided on the medium-facing surface, in the vicinity of the main magnetic pole; the shape of the plasmon antenna, as viewed from a direction perpendicular to the medium-facing surface, is a triangle having first, second and third corners; the plasmon antenna is shaped as a flat plate the thickness direction of which is perpendicular to the medium-facing surface; the distance from the first corner to the main magnetic pole is shorter than the distance from the second corner to the main magnetic pole and the distance from the third corner to the main magnetic pole, and the interior angle α of the first corner, the interior angle β of the second corner and the interior angle γ of the third corner satisfy relationships α<β, α<γ and β≠γ.

As a result of diligent research, the inventors found that near-field light emission intensity generated in the vicinity of the sharpest first corner becomes strongest, while near-field light emission intensity generated in the vicinity of the second and third corners becomes relatively weaker, when the first, second and third corners of the plasmon antenna, as viewed from a direction perpendicular to the medium-facing surface, satisfy the relationship α<β, α<γ and β≠γ. Therefore, the present invention affords a thermally assisted magnetic head comprising a plasmon antenna in which the intensity of near-field light generated in the vicinity of a first corner, which is located close to a main magnetic pole, is strongest, while the intensity of near-field light generated in the vicinity of the second corner and the third corner is relatively weak.

Preferably, the plasmon antenna satisfies the relationship 20 degrees≦α≦55 degrees. Near-field light of particularly strong intensity can be generated thereby in the vicinity of the first corner, which is the sharpest corner, of the plasmon antenna, as compared with the case in which the plasmon antenna has a symmetrical shape, with β=γ, as viewed from a direction perpendicular to the medium-facing surface.

Preferably, the plasmon antenna comprises gold or silver.

The head gimbal assembly according to the present invention comprises the above-described thermally assisted magnetic head and a suspension onto which the thermally assisted magnetic head is mounted.

The present invention affords thus a head gimbal assembly comprising a thermally assisted magnetic head having a plasmon antenna in which the intensity of near-field light generated in the vicinity of a sharpest first corner, as viewed from a direction perpendicular to the medium-facing surface, and which is located close to a main magnetic pole, is strongest, while the intensity of near-field light generated in the vicinity of the second corner and the third corner is relatively weak.

The hard disk drive according to the present invention comprises the above-described head gimbal assembly and a magnetic recording medium facing the medium-facing surface.

The present invention affords thus a hard disk drive comprising a thermally assisted magnetic head having a plasmon antenna in which the intensity of near-field light generated in the vicinity of a first corner that is located close to a main magnetic pole is strongest, while the intensity of near-field light generated in the vicinity of the second corner and the third corner is relatively weak.

The method for manufacturing a thermally assisted magnetic head according to the present invention is a method for manufacturing a thermally assisted magnetic head having a plasmon antenna shaped as a triangular flat plate as viewed from a direction perpendicular to a medium-facing surface, comprising the steps of: forming a metal layer to be the plasmon antenna on an insulating layer; forming a first mask layer on part of a stacking surface of the metal layer and etching a region of the stacking surface of the metal layer that is not masked by the first mask layer, to form thereby, in the metal layer, a first inclined surface extending from the stacking surface to the insulating layer; forming a second mask layer on the first inclined surface and the stacking surface of the metal layer, and etching the second mask layer to remove the second mask layer from the stacking surface of the metal layer, leaving the second mask layer remained on the first inclined surface; and forming, on the metal layer, a second inclined surface extending from the first inclined surface to the insulating layer and defining, with the first inclined surface, an interior angle α of a first corner of the plasmon antenna, by further etching the metal layer, using as a mask the second mask layer remained on the first inclined surface; wherein the first inclined surface and the stacking surface of the insulating layer define an interior angle β of a second corner of the plasmon antenna; the second inclined surface and the stacking surface of the insulating layer define an interior angle γ of a third corner of the plasmon antenna; and relationships α<β, α<γ and β≠γ are satisfied.

As a result of diligent research, the inventors found that near-field light emission intensity generated in the vicinity of the sharpest first corner strengthens, while near-field light emission intensity generated in the vicinity of the second and third corners becomes relatively weak, when the first, second and third corners of the plasmon antenna, as viewed from a direction perpendicular to the medium-facing surface, satisfy the relationship α<β, α<γ and β≠γ. Therefore, the present invention affords thus a method for manufacturing a thermally assisted magnetic head comprising a plasmon antenna in which the intensity of near-field light generated in the vicinity of a first corner that is located close to a main magnetic pole is strongest, while the intensity of near-field light generated in the vicinity of the second corner and the third corner is relatively weak.

Preferably, etching of the second mask layer is performed by dry etching while rotating a substrate on which the metal layer to be the plasmon antenna is formed. Doing so allows achieving a desired ion incidence angle and desired incidence duration, whereby the amount of etching can be controlled accurately.

The present invention provides thus a thermally assisted magnetic head, a head gimbal assembly and a hard disk drive, the thermally assisted magnetic head comprising a plasmon antenna in which the intensity of near-field light generated at a corner located close to a main magnetic pole is strongest, while the intensity of near-field light generated at other corners is relatively weak, and provides a method for manufacturing such a thermally assisted magnetic head.

BRIEF DESCRIPTION OF THE DRAWINGS

FIG. 18A is a plan-view diagram for explaining a plasmon antenna in an example;

FIG. 19 is a diagram illustrating shape conditions of plasmon antennas in Example 1, Example 2, Comparative Example 1 and Comparative Example 2;

FIG. 20A is a diagram illustrating simulation results in Example 1;

FIG. 20B is a diagram illustrating simulation results in Example 1;

FIG. 22A is a diagram illustrating simulation results in Example 2;

FIG. 22B is a diagram illustrating simulation results in Example 2;

FIG. 24A is a diagram illustrating simulation results in Comparative Example 1;

FIG. 24B is a diagram illustrating simulation results in Comparative Example 1;

FIG. 26A is a diagram illustrating simulation results in Comparative Example 2;

FIG. 26B is a diagram illustrating simulation results in Comparative Example 2;

FIG. 29 is a diagram illustrating shape conditions of plasmon antennas in Example 3, Example 4, Comparative Example 3 and Comparative Example 4;

FIG. 31 is a diagram illustrating shape conditions and near-field light emission intensity generated at vertex A of plasmon antennas in Example 1, Example 2, Examples 5 to 7, Comparative Example 1 and Comparative Example 5;

FIG. 32 is a diagram illustrating shape conditions and near-field light emission intensity generated at vertex A of plasmon antennas in Examples 8 to 14 and Comparative Examples 6 and 7;

FIG. 33 is a diagram illustrating shape conditions and near-field light emission intensity generated at vertex A in plasmon antennas in Example 3, Example 4, Examples 15 to 17, Comparative Example 3 and Comparative Example 8;

FIG. 34 is a diagram illustrating shape conditions and near-field light emission intensity generated at vertex A of plasmon antennas in Examples 18 to 24 and Comparative Examples 9 and 10.

DESCRIPTION OF THE PREFERRED EMBODIMENTS

Figure 1:
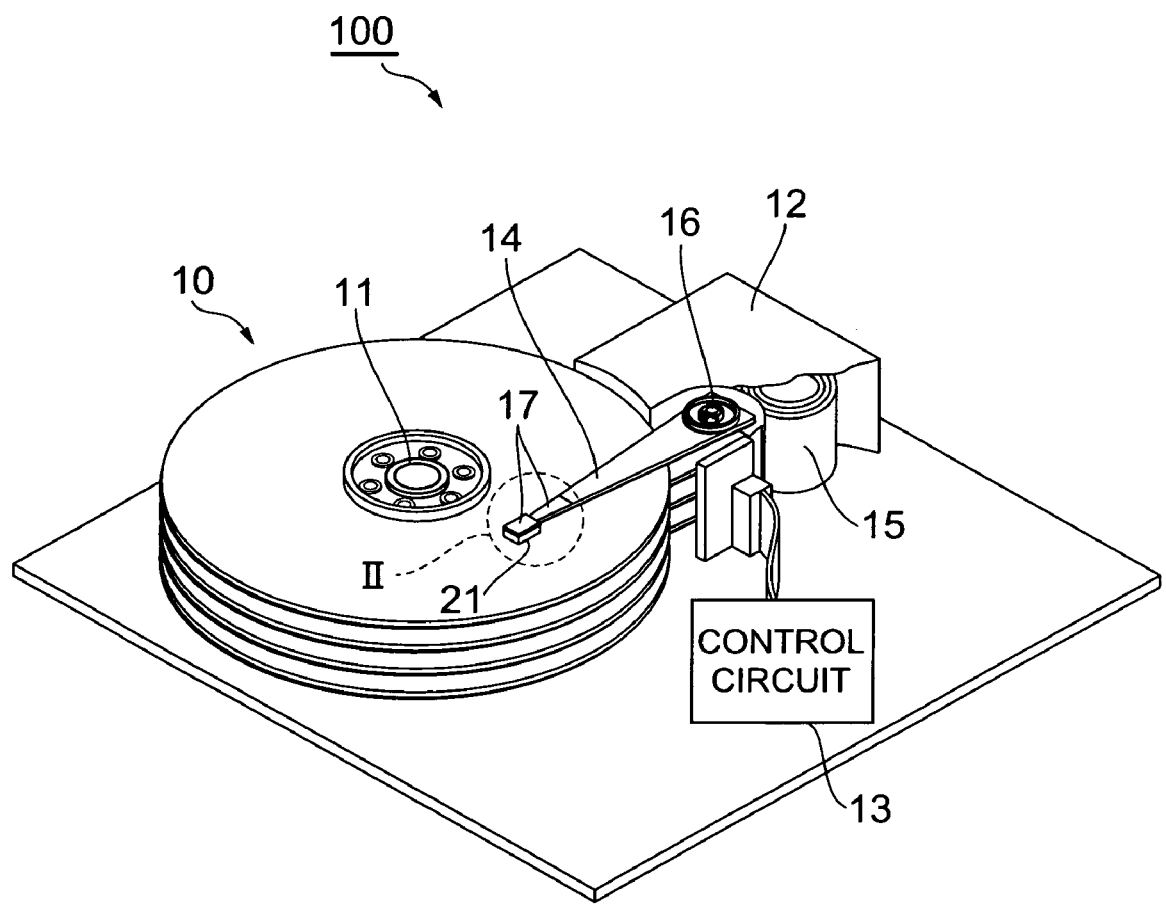
FIG. 1 is a perspective-view diagram of a hard disk drive according to an embodiment.

Embodiments of the thermally assisted magnetic head, the head gimbal assembly, the hard disk drive, and the method for manufacturing the thermally assisted magnetic head are explained in detail next with reference to accompanying drawings. Wherever possible, identical elements are denoted with identical reference numerals.

FIG. 1 is a perspective-view diagram of a hard disk drive according to an embodiment.

The hard disk drive 100 comprises magnetic disks 10, as a plurality of magnetic recording media that rotate around a rotation shaft of a spindle motor 11; an assembly carriage device 12 for positioning each thermally assisted magnetic head 21 on a track; and a recording, reproduction, and emission control circuit (control circuit) 13 for controlling writing and reading operations of the thermally assisted magnetic head 21, and for controlling a laser diode, as a light source that emits a laser beam, for performing thermally assisted magnetic recording, as described in detail below.

The assembly carriage device 12 is provided with a plurality of drive arms 14. These drive arms 14 are rockable around a pivot bearing shaft 16 by a voice coil motor (VCM) 15, and are stacked in the direction along this shaft 16. A head gimbal assembly (HGA) 17 is attached to the leading end of each drive arm 14. Each HGA 17 is provided with a thermally assisted magnetic head 21 in such a manner that the latter faces the surface of each magnetic disk 10. The surface of the magnetic head 21 facing the surface of the magnetic disk 10 is a medium-facing surface S (also called an air bearing surface) of the thermally assisted magnetic head 21. The magnetic disks 10, drive arms 14, HGAs 17, and thermally assisted magnetic heads 21 may each be provided singly.

Figure 2:
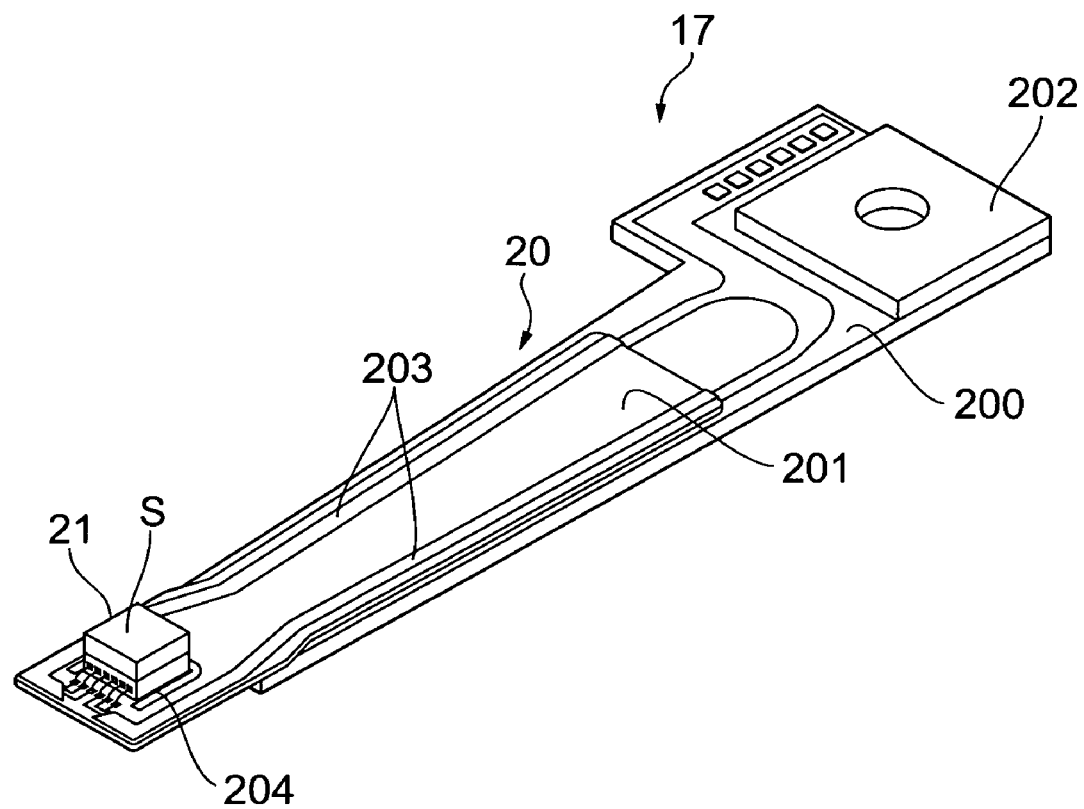
FIG. 2 is a perspective-view diagram of an HGA 17.

FIG. 2 is a perspective-view diagram of the HGA 17. In the figure, the medium-facing surface S of the HGA 17 is depicted facing upwards.

The HGA 17 is constructed by fixing the thermally assisted magnetic head 21 to a leading end of a suspension 20 and by electrically connecting one end of a wiring member 203 to terminal electrodes of the thermally assisted magnetic head 21. The suspension 20 comprises mainly a load beam 200, an elastic flexure 201 fixed and supported on the load beam 200, a tongue portion 204 formed in a plate spring shape at the tip of the flexure, a base plate 202 provided on the base of the load beam 200, and a wiring member 203 provided on the flexure 201 and comprising a lead conductor and connection pads electrically connected to the both ends of the lead conductor.

It is obvious that the structure of the suspension in the HGA 17 of the present invention is not limited to the above-described structure. Although not shown in the figure, an IC chip for head driving may be mounted midway in the suspension 20.

Figure 3:
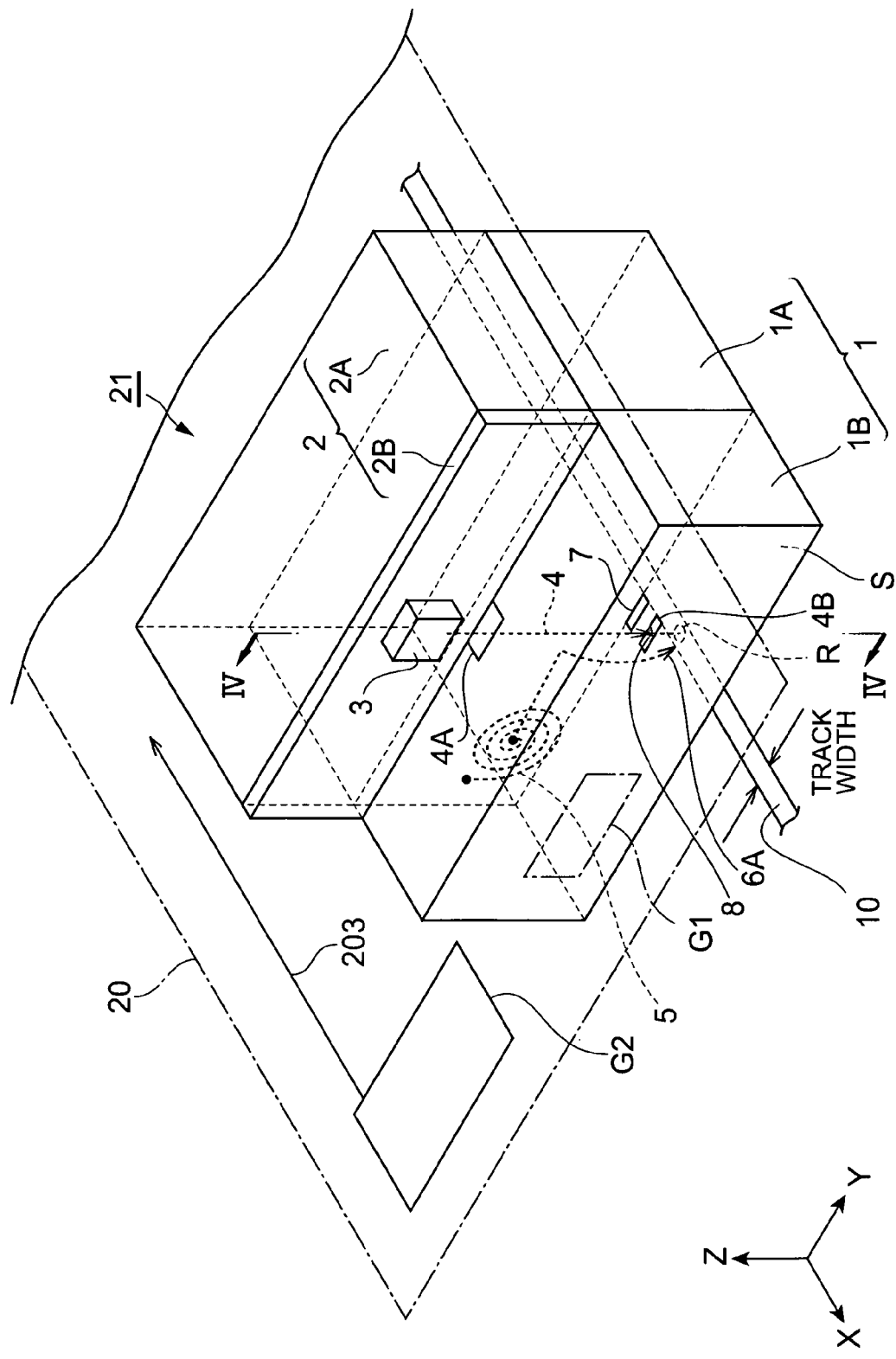
FIG. 3 is an enlarged perspective-view diagram of the vicinity of a thermally assisted magnetic head 21 illustrated in FIG. 1.

FIG. 3 is an enlarged perspective-view diagram of the vicinity of the thermally assisted magnetic head 21 illustrated in FIG. 1.

The thermally assisted magnetic head 21 is mounted on the leading end of the suspension 20. The thermally assisted magnetic head 21 comprises a slider 1 and a light source unit 2 bonded together. The slider 1 comprises a magnetic head portion 1B formed on the YZ plane of a slider substrate 1A. The XY plane of the magnetic head portion 1B, in the −Z direction, constitutes the medium-facing surface S. The light source unit 2 comprises an insulating layer 2B on the YZ plane of a light source support substrate 2A. A light-emitting element 3 is fixed to the insulating layer 2B, on the YZ plane.

The magnetic head portion 1B comprises a plurality of elements embedded in an insulator. Each of these elements comprises a spiral coil 5 for generating a magnetic field for information writing when current is supplied to the coil; a main magnetic pole 6A extending from the center of the coil, for guiding the magnetic flux generated by the coil 5 up to the medium-facing surface S; a magnetoresistive effect element (MR element) 7 having a magnetoresponsive surface exposed at the medium-facing surface S; and a core 4 of a waveguide extending in the Z-axis direction, and surrounded with an insulator as a cladding.

The main magnetic pole 6A is exposed at the medium-facing surface S. However, the main magnetic pole 6A need not be exposed at the medium-facing surface S, provided that the main magnetic pole 6A is positioned in such a manner so as to be capable of applying a magnetic field towards a recording region R on the surface of the magnetic disk 10. An auxiliary magnetic pole may be provided, as the case may require, in the vicinity of the main magnetic pole 6A, in such a manner that magnetic field lines (magnetic flux) MF from the main magnetic pole 6A flow into the auxiliary magnetic pole via the recording region R (see FIG. 4).

The core 4 comprises a dielectric layer having a higher refractive index than the surrounding cladding, while the cladding comprises a dielectric layer having a lower refractive index than the core 4. The core 4 has a light incidence surface 4A onto which light from the light-emitting element 3 is incident, on the XY plane, in the positive direction of the Z-axis, and a light exit surface 4B on the XY plane, in the negative direction of the Z-axis, i.e. on the medium-facing surface S. In the present embodiment, the light-emitting element 3 is an edge-emitting laser diode. A laser beam emitted through the end face, which is parallel to the XY plane, enters into the core 4 via the light incidence surface 4A, and strikes the plasmon antenna 8 formed on light exit surface 4B. The light-emitting element 3 is thus provided in such a manner that the emission light thereof is incident on the plasmon antenna 8. As illustrated in FIG. 3, the plasmon antenna 8 has a triangular shape as viewed from the Z-axis direction, i.e. from the direction perpendicular to the medium-facing surface S. The plasmon antenna 8, moreover, forms a flat plate the thickness direction whereof is the Z-axis direction. The core 4 functions as a light guide for guiding the emission light of the light-emitting element 3 to the plasmon antenna 8.

The core 4 can be formed by stacking a plurality of dielectric layers having different refractive indices. Light propagating through the interior of the core 4 becomes thus refracted towards the layers having a higher average refractive index per unit thickness. When the core 4 comprises multiple dielectric layers, the thickness of the dielectric layers and the refractive indices thereof are set in such a manner that the light propagating through the interior of the core 4 comes near the plasmon antenna 8. That is, the average refractive index per unit thickness in the core 4 increases as the distance to the plasmon antenna 8 decreases.

The plasmon antenna 8 resonates with the incident beam and generates near-field light that heats up the recording region R. Information is written onto the recording region R as the magnetic field lines from the leading end of the main magnetic pole 6A enter the heated recording region R.

An electrode pad group G1, comprising a plurality of electrode pads, is formed on the YZ plane, in the negative direction of the X-axis, on the magnetic head portion 1B. The electrode pads are each connected to both ends of the coil 5 and to upper and lower electrodes of the MR element 7. The MR element 7 is obtained by stacking a ferromagnetic layer having a fixed magnetization direction, and a magnetization free layer where the magnetization direction is deflected in response to the surrounding magnetic field. Magnetoresistance varies in the MR element 7 in response to differences in the magnetization direction of the magnetization free layer and the ferromagnetic layer. Specifically, the magnetoresistance of the MR element 7 varies in response to the magnetic field generated around the recording region R, whereupon there varies also the current flowing between a pair of electrode pads in the electrode pad group G1. A hard magnet for magnetic domain control of the magnetization free layer is disposed at both ends, in the Y-axis direction, of the magnetization free layer.

During information writing, current is made to flow between another pair of electrode pads of the electrode pad group G1, such that the current flows between the ends of the coil 5. The magnetic recording elements are preferably perpendicular magnetic recording elements. The electrode pads in the electrode pad group G1 are electrically connected a second electrode pad group G2 formed on the suspension 20, and to the exterior, via the wiring member 203. The second electrode pad group G2 connected to the wiring member 203 comprises also a pair of electrode pads for supplying driving current to the light-emitting element 3. When driving current is caused to flow between these electrode pads, the light-emitting element 3 emits light and outputs a laser beam as excitation light.

The core 4, which may take on various shapes, extends linearly along the Z-axis in the present embodiment. For the sake of a clearer explanation, the core 4 is denoted with the same reference numeral as the optical path of the beam LB (FIG. 4) that is emitted by the light-emitting element 3.

The slider substrate 1A and the light source support substrate 2A comprise, for instance, AlTiC ($Al_2O_3$—TiC). When substrates having high thermal conductivity are used as the substrates 1A and 2A, these substrates have a heat-dissipating function. The XY plane of the light source support substrate 2A, in the positive direction of the Z-axis, is bonded to the rear face of the suspension 20.

The magnetic head portion 1B is formed by stacking the MR element 7, the cladding, the core 4, the coil 5 and the main magnetic pole 6A along the X-axis. The stacking direction runs along the array direction of the recording region R within a track, the track width being parallel to the Y-axis.

Figure 4:
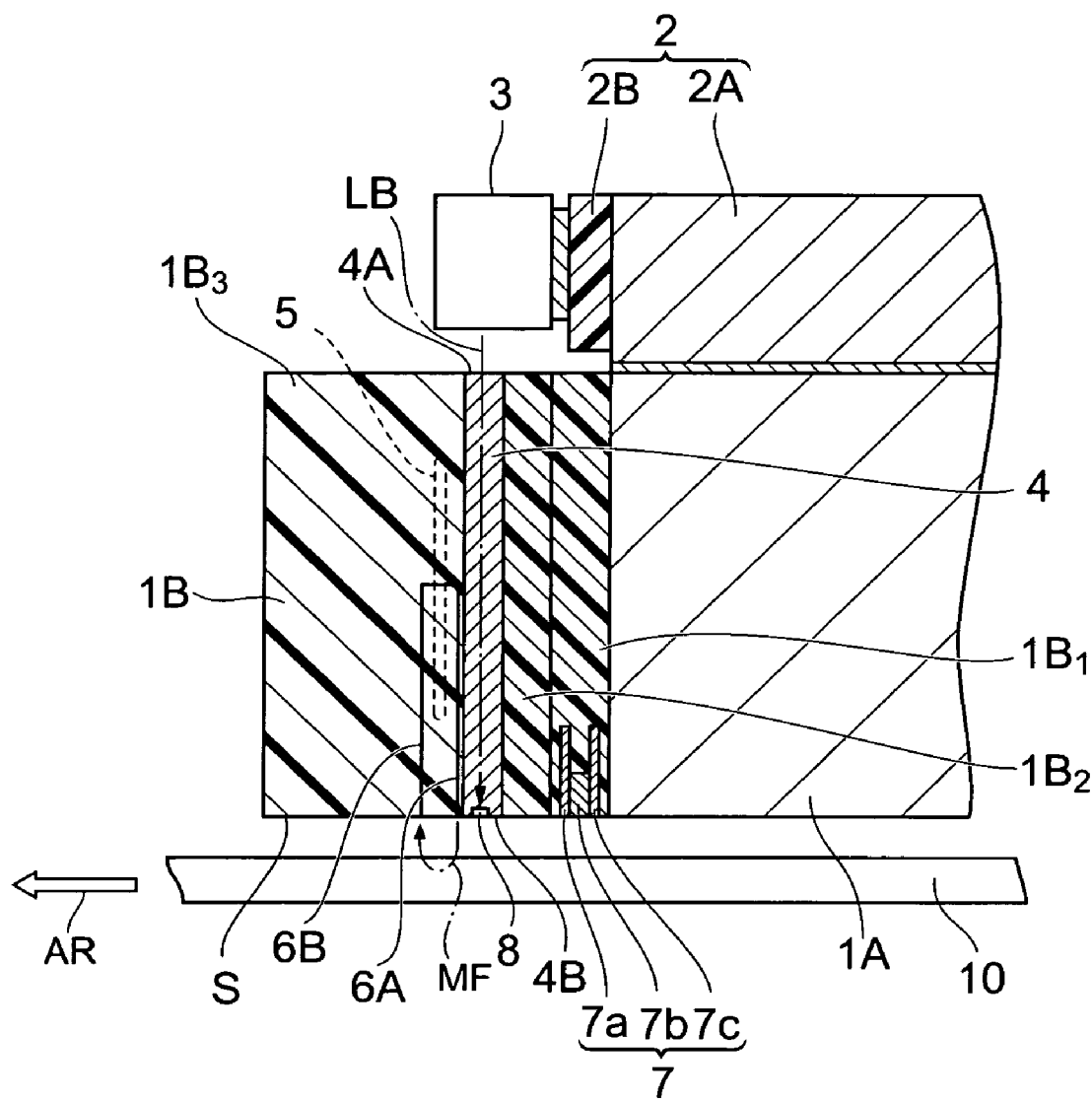
FIG. 4 is a cross-sectional diagram of the thermally assisted magnetic head illustrated in FIG. 3 along the arrow IV-IV.

FIG. 4 is a cross-sectional diagram of the thermally assisted magnetic head illustrated in FIG. 3 along the arrow IV-IV.

The light-emitting element 3 is bonded/fixed to the insulating layer 2B. An energy beam outputted by the light-emitting element 3 in the −Z direction enters into the core 4 through the light incidence surface 4A of the core 4, and strikes the plasmon antenna 8 provided on the light exit surface 4B of the core 4.

The leading end of the main magnetic pole 6A is positioned in the vicinity of the plasmon antenna 8. As a result, when the recording region R of the magnetic recording medium is heated by near-field light generated by the plasmon antenna 8, the recording magnetic field from the main magnetic pole 6A can be applied to the recording region R before the latter reverts to its original temperature. The main magnetic pole 6A is physically connected to a magnetic material layer, not shown, as a magnetic yoke. The magnetic material layer is further physically connected to a magnetic material layer 6B that makes up the auxiliary magnetic pole. An insulator layer $1B_2$, as a cladding, surrounds the periphery of the core 4.

An overcoat layer $1B_3$ comprising an insulating material is provided, as a cladding, on the core 4. A lower insulator layer $1B_1$ is interposed between the insulator layer $1B_2$ and the slider substrate 1A. The MR element 7 is embedded in the lower insulator layer $1B_1$. The MR element 7 comprises an upper shield electrode 7a, a lower shield electrode 7c and a magnetoresistive effect layer 7b interposed between the upper shield electrode 7a and the lower shield electrode 7c. The magnetoresistive effect layer 7b is a multilayer film that elicits a magnetoresistive effect, for instance a tunnel magnetoresistive effect layer obtained by stacking a magnetization free layer and a ferromagnetic layer via a tunnel barrier layer, or a giant magnetoresistive effect layer obtained by stacking a magnetization free layer and a ferromagnetic layer via a non-magnetic metal layer.

The lower insulator layer $1B_1$, the insulator layer $1B_2$ and the overcoat $1B_3$ of the present example comprise, for instance, low-refractive index $Al_2O_3$, while the core 4 comprises, for instance, a high-refractive index tantalum oxide ($TaO_X$). The material of the main magnetic pole 6A and the magnetic material layer 6B comprises, for instance, an alloy of two or three among Ni, Fe and Co, or an alloy having the foregoing as a main component and having added thereto a predetermined element.

Figure 5:
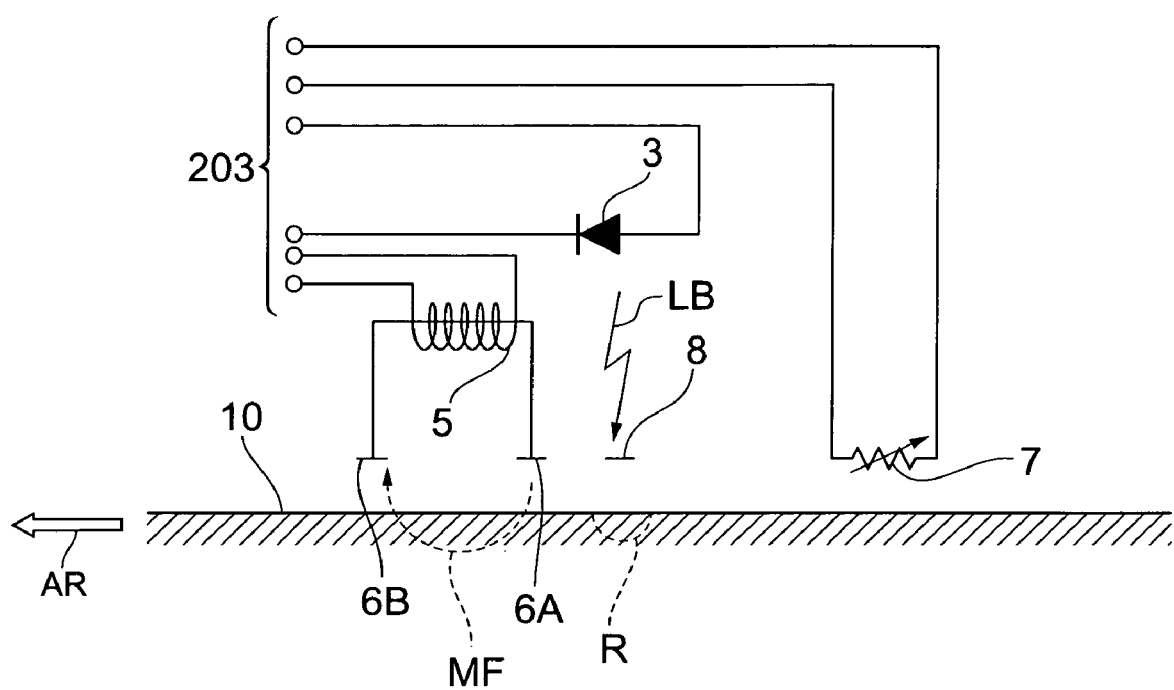
FIG. 5 is a diagram illustrating electric connections of the thermally assisted magnetic head.

FIG. 5 is a diagram illustrating electric connections of the thermally assisted magnetic head.

The light-emitting element 3, the coil 5 and both ends of the MR element 7 are connected to the wiring member 203. Conduction takes place in the light-emitting element 3 and the coil 5 via the wiring member 203. Also, the output from the MR element 7 is read via the wiring member 203.

When the light-emitting element 3 is energized, an excitation light beam LB strikes the plasmon antenna 8 and heats the recording region R of the magnetic disk 10 in the vicinity of the plasmon antenna 8. The magnetic disk 10 moves in the direction denoted by the arrow AR in the figure, so that the leading end of the main magnetic pole 6A becomes positioned over the heated recording region R. When the coil 5 is then energized, the magnetic flux generated by the coil 5 reaches the leading end of the main magnetic pole 6A, whereupon magnetic field lines MF exiting through the leading end of the main magnetic pole 6A traverse the magnetic disk 10 and return to the magnetic material layer 6B, as a result of which information is written in the recording region R of the magnetic disk 10.

Thus, the thermally assisted magnetic head of the present embodiment further comprises the light-emitting element 3 for irradiating excitation light such as a laser beam. Sufficient near-field light can thus be generated by the plasmon antenna 8 through irradiation of the latter with an excitation light beam LB.

When the recording region R having information written thereon faces the MR element 7, the orientation of the magnetization of the magnetization free layer in the MR element 7 changes in response to the magnetic field from the recording region R, whereupon the magnetoresistance of the MR element 7 changes as well. Information written in the recording region R can be read as a result.

The plasmon antenna 8 of the present embodiment is explained in detail next.

Figure 6:
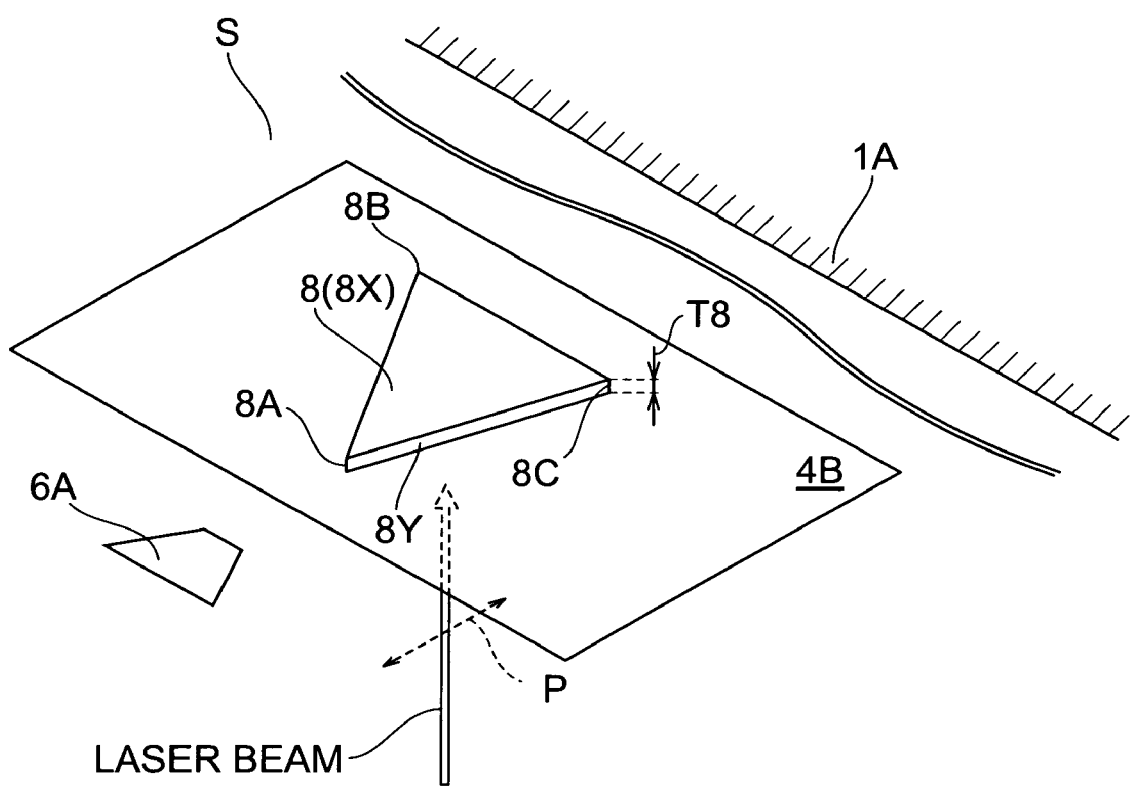
FIG. 6 is a perspective-view diagram of the vicinity of a plasmon antenna on a medium-facing surface.
Figure 6:
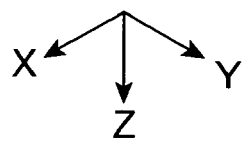
Figure 7:
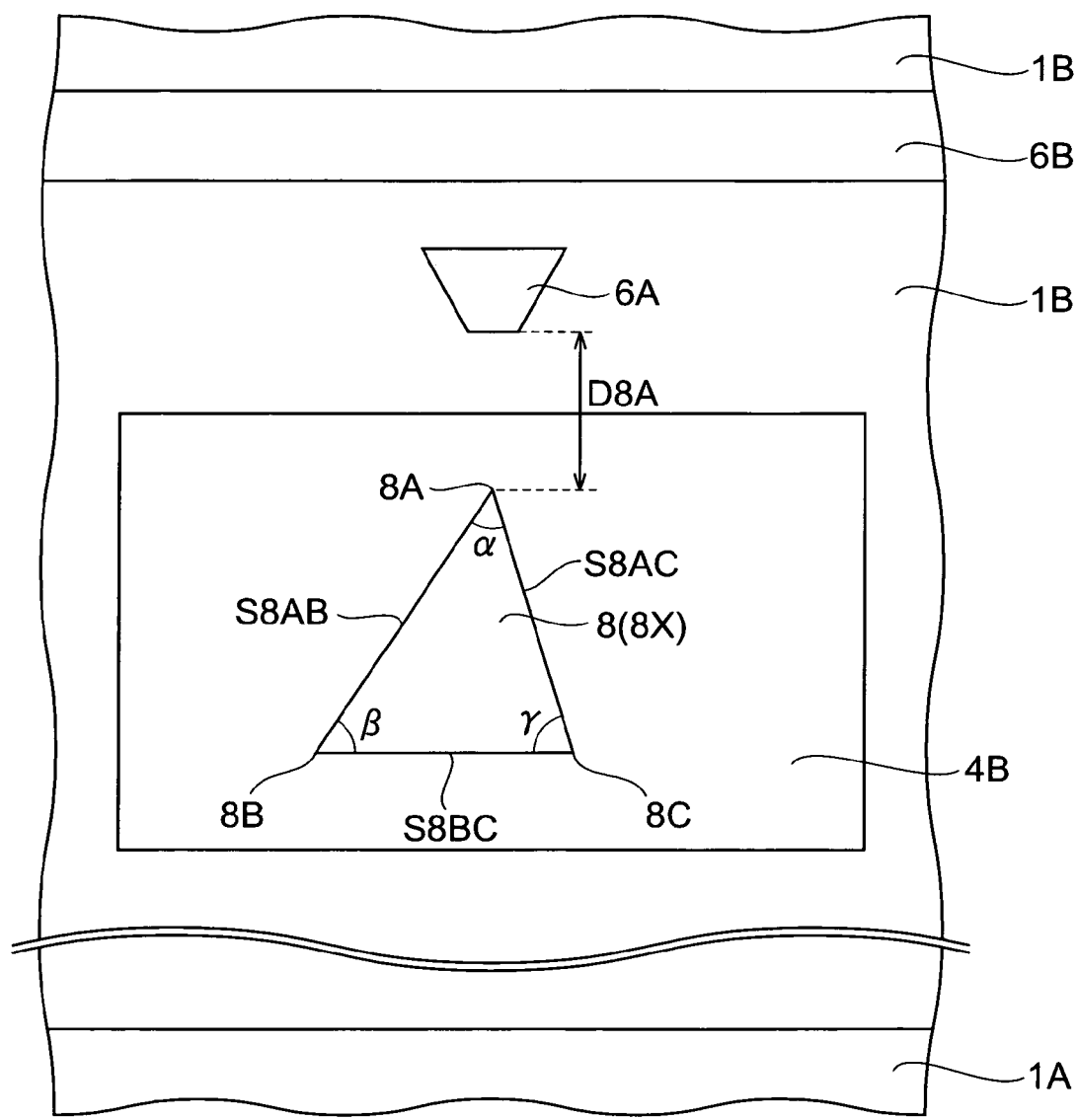
FIG. 7 is a plan-view diagram of the vicinity of the plasmon antenna on the medium-facing surface.

FIG. 6 is a perspective-view diagram of the vicinity of the plasmon antenna on the medium-facing surface, and FIG. 7 is a plan-view diagram of the vicinity of the plasmon antenna on the medium-facing surface.

As illustrated in FIGS. 6 and 7, the plasmon antenna 8 is provided on the light exit surface 4B. The plasmon antenna 8 is shaped as a triangular flat plate having a first vertex (first corner) 8A, a second vertex (second corner) 8B and a third vertex (third corner) 8C. More specifically, the plasmon antenna 8 is formed, on the XY plane of the medium-facing surface S, as a triangular flat plate the thickness of which extends in the Z-axis direction. Therefore, the plasmon antenna 8 has a front face 8X that is parallel to the medium-facing surface S, and side faces 8Y that define the thickness of the plasmon antenna 8 in the Z-axis direction.

As illustrated in FIG. 7, the first vertex 8A and the main magnetic pole 6A face each other across a short distance on the medium-facing surface S. The distance D8A from the first vertex 8A to the main magnetic pole is shorter than the distance from the second vertex 8B to the main magnetic pole and the distance from the third vertex 8C to the main magnetic pole. The distance D8A is, for instance, 0.01 to 0.2 µM.

The interior angle α of the first vertex 8A is smaller than the interior angle β of the second vertex 8B and the interior angle γ of the third vertex 8C (interior angle α<interior angle β, interior angle α<interior angle γ). Also, the sizes of the interior angle β and the interior angle γ are dissimilar (interior angle β≠interior angle γ). The interior angle α of the first vertex 8A refers to the inner angle of the triangle of the plasmon antenna 8, among the angles formed by the two sides that define the first vertex 8A, as viewed from a direction perpendicular to the medium-facing surface; the interior angle β of the second vertex 8B refers to the inner angle of the triangle of the plasmon antenna 8, among the angles formed by the two sides that define the second vertex 8B; and the interior angle γ of the third vertex 8C refers to the inner angle of the triangle of the plasmon antenna 8, among the angles formed by the two sides that define the third vertex 8C.

As illustrated in FIG. 6, the thickness T8 of the plasmon antenna 8 is, for instance, 0.01 to 0.2 μm. The length of the side S8AB from vertex A to vertex B of the plasmon antenna 8 is, for instance, 0.01 to 0.5 μm. The length of the side S8BC from vertex B to vertex C is, for instance, 0.01 to 0.5 μm. The length of the side S8AC from vertex A to vertex C is, for instance, 0.01 to 0.5 μm.

Materials that can be used as the material that makes up the plasmon antenna 8 include, for instance, metals such as gold (Au), silver (Ag), copper (Cu), iridium (Ir), magnesium (Mg), platinum (Pt), aluminum (Al) or palladium (Pd), or an alloy comprising at least one of these metals.

When irradiated by a laser beam, charges concentrate in the plasmon antenna 8, which emits thereupon near-field light towards the magnetic recording medium. This charge concentration is strongest in the vicinity of the first vertex 8A, which has the smallest (sharpest) interior angle among the vertices of the plasmon antenna 8. As a result, near-field light is irradiated mainly from the vicinity of the first vertex 8A of the plasmon antenna 8. Near-field light is thus generated at the first vertex 8A, which is located closest to the main magnetic pole 6A among the vertices of the plasmon antenna 8. This allows shortening, as a result, the time that it takes for the magnetic field lines MF from the main magnetic pole 6A to reach the recording region R of the magnetic recording medium, after heating thereof. The thermally assisted magnetic head of the present embodiment is thus advantageous in terms of achieving higher recording density.

However, charge concentration occurs also in the vicinity of the second vertex 8B and the third vertex 8C during laser beam irradiation, and hence near-field light is also emitted from the vicinity of the second vertex 8B and the third vertex 8C. Strong intensity of near-field light out of the vicinity of the second vertex 8B and the third vertex 8C is problematic in that the intensity of near-field light generated in the vicinity of the first vertex decreases then in proportion, as a result of which the magnetic recording medium may fail to be sufficiently heated. Another problem is side erasing, which results from heating of the region surrounding the recording region R of the magnetic recording medium by the near-field light from the vicinity of the second vertex 8B and the third vertex 8C.

As a result of diligent research, however, the inventors have found that when the shape of the plasmon antenna 8, as viewed from a direction perpendicular to the medium-facing surface S, satisfies the relationships interior angle α<interior angle β, interior angle α<interior angle γ, and interior angle β≠interior angle γ, the near-field light emission intensity generated in the vicinity of the sharpest first corner becomes strongest while the near-field light emission intensity generated in the vicinity of the second corner and the third corner becomes relatively weak. That is, the inventors found that when the shape of the plasmon antenna 8 as viewed from a direction perpendicular to the medium-facing surface S is a triangular shape not bilaterally symmetrical but bilaterally asymmetrical relative to the first vertex 8A, the near-field light emission intensity generated in the vicinity of the sharpest first corner becomes strongest, while the near-field light emission intensity generated in the vicinity of the second corner and the third corner becomes relatively weak. Therefore, the thermally assisted magnetic head of the present embodiment allows generating near-field light of strong enough intensity in the vicinity of the first vertex 8A that is located close to the main magnetic pole 6A, and thus the recording region R of the magnetic recording medium can be sufficiently heated during thermally assisted magnetic recording. Also, the intensity of the near-field light generated in the vicinity of the second vertex 8B and the third vertex 8C is relatively weak, and hence side erasing can be sufficiently suppressed during thermally assisted magnetic recording.

In addition to the relationship (interior angle α<interior angle β, interior angle α<interior angle γ, and interior angle β≠interior angle γ), the plasmon antenna 8 satisfies preferably also the relationship (20 degrees≦α≦55 degrees), as described in detail below. In this case near-field light of particularly strong intensity can be generated in the vicinity of the sharpest first vertex 8A of the plasmon antenna 8.

Preferably, the polarization direction P of the laser beam irradiated onto the plasmon antenna 8 has a component in the X-axis direction, which is the direction in which the first vertex 8A and the main magnetic pole 6A oppose each other. More preferably, the polarization direction P coincides with the X-axis direction, as illustrated in FIG. 6, since in that case the intensity of the near-field light generated in the vicinity of the first vertex 8A is particularly strong.

The plasmon antenna 8 may have a shape such that the values of the interior angle β and the interior angle γ in the above embodiment are swapped.

A method for manufacturing the thermally assisted magnetic head according to the present embodiment is explained next with reference to FIGS. 8A to 17B.

FIG. 8A, FIG. 9A, FIG. 10A, FIG. 11A, FIG. 12A, FIG. 13A, FIG. 14A, FIG. 15A, FIG. 16A and FIG. 17A are plan-view diagrams of intermediates of a thermally assisted magnetic head, viewed from the X-axis direction, which is a stacking direction, for explaining a manufacturing method of a thermally assisted magnetic head. FIG. 8B, FIG. 9B, FIG. 10B, FIG. 11B, FIG. 12B, FIG. 13B, FIG. 14B, FIG. 15B, FIG. 16B and FIG. 17B are cross-sectional diagrams, along a predefined line, of the intermediates of the thermally assisted magnetic head of FIG. 8A, FIG. 9A, FIG. 10A, FIG. 11A, FIG. 12A, FIG. 13A, FIG. 14A, FIG. 15A, FIG. 16A and FIG. 17A, respectively.

In the method for manufacturing the thermally assisted magnetic head, firstly there are formed, using known methods, the lower insulator layer 1B₁ and the MR element 7 on the YZ plane of the slider substrate 1A, in such a manner that the MR element 7 is embedded in the lower insulator layer 1B₁, followed by formation of the insulator layer 1B₂, comprising for instance $Al_2O_3$, on the lower insulator layer 1B₁ (FIG. 4).

Figure 8A:
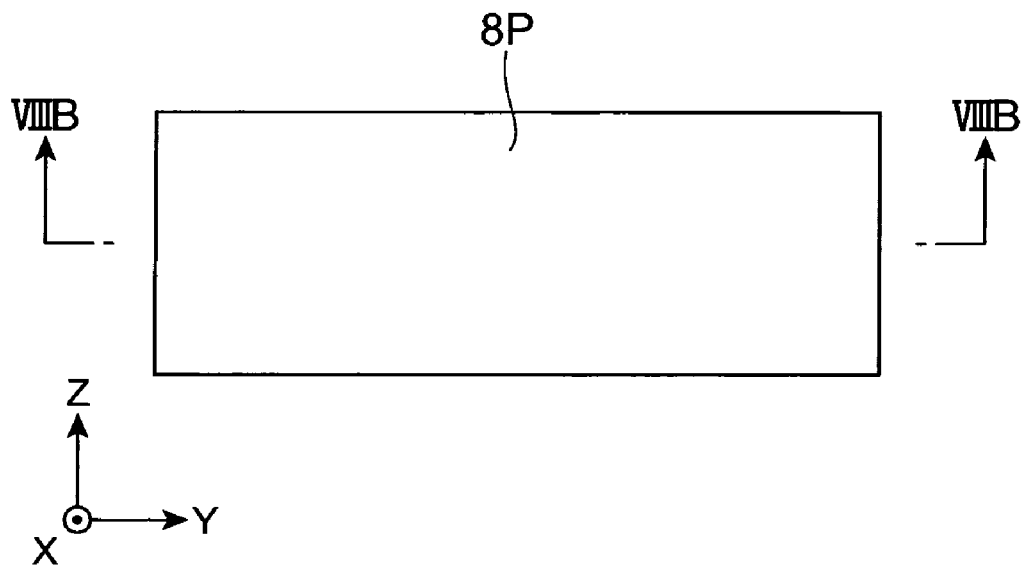
FIG. 8A is a plan-view diagram of an intermediate of the thermally assisted magnetic head, for explaining a manufacturing method thereof.
Figure 8B:
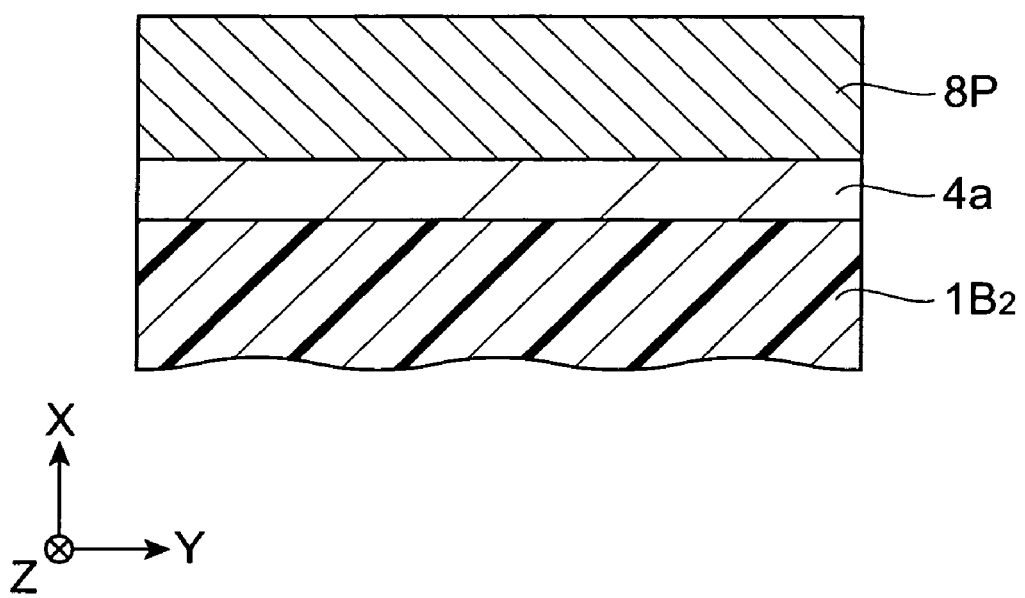
FIG. 8B is a cross-sectional diagram of an intermediate of the thermally assisted magnetic head, for explaining a manufacturing method thereof.

As illustrated in FIGS. 8A and 8B, the insulating layer 4a and the metal layer 8P that will be the plasmon antenna are formed, for instance by sputtering, on the insulator layer 1B₂. The insulating layer 4a, which is a layer that will be a part of the core 4, comprises an insulating layer, for instance of tantalum oxide ($TaO_X$), having a higher refractive index than the lower insulator layer 1B₁. The thickness of the insulating layer 4a is, for instance, 0 to 2 μm. The insulating layer 4a may be left out. When the insulating layer 4a is not provided, the metal layer 8P is formed directly on the insulator layer 1B₂. The metal layer 8P comprises a material of the portion that will be later the plasmon antenna, for instance a metal such as gold (Au), silver (Ag), copper (Cu), iridium (Ir), magnesium (Mg), platinum (Pt), aluminum (Al) or palladium (Pd). The thickness of the metal layer 8P is, for instance, 50 to 300 nm.

Figure 9A:
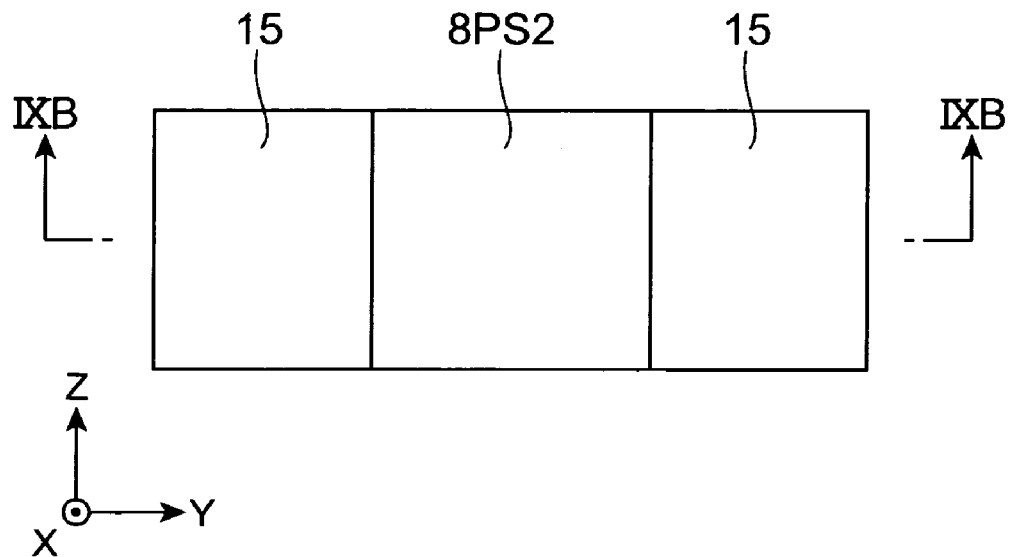
FIG. 9A is a plan-view diagram of an intermediate of the thermally assisted magnetic head, for explaining a manufacturing method thereof.
Figure 9B:
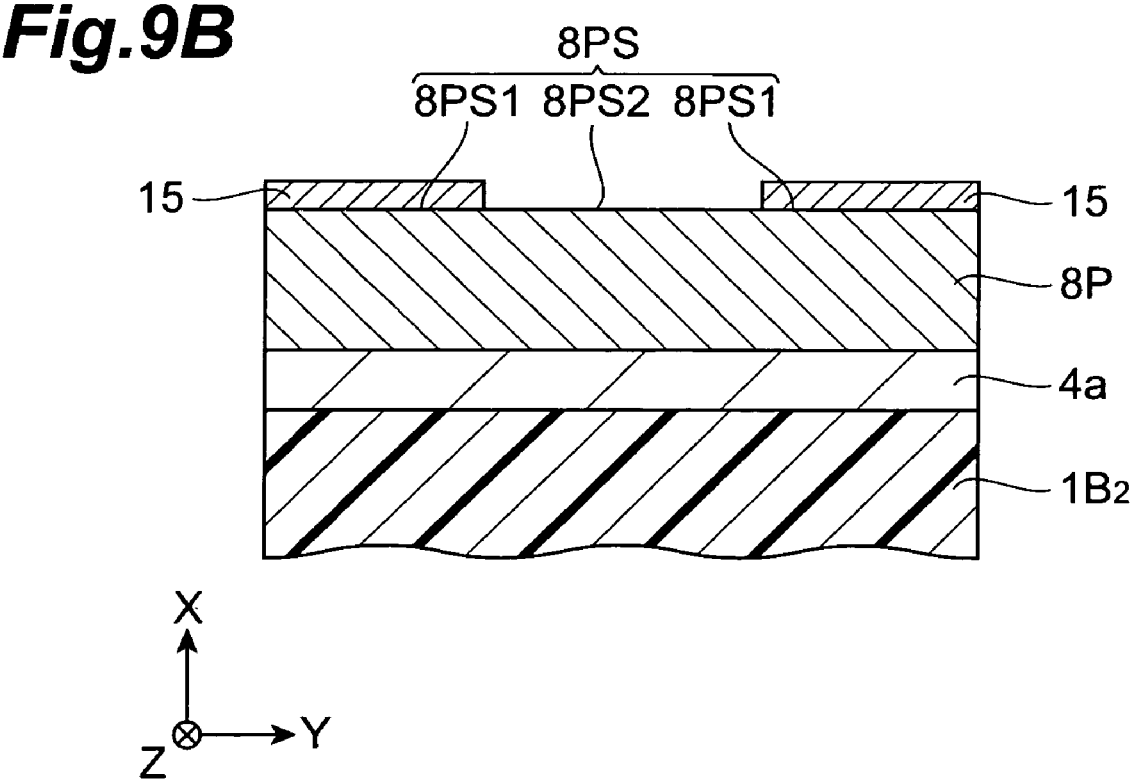
FIG. 9B is a cross-sectional diagram of an intermediate of the thermally assisted magnetic head, for explaining a manufacturing method thereof.

Next, a pair of first mask layers 15 is formed, for instance by sputtering, on part of the stacking surface 8PS of the metal layer 8P, as illustrated in FIGS. 9A and 9B. The thickness of the first mask layers 15 is, for instance, 8 to 50 nm. The first mask layers 15 comprise a metal such as Ta or NiFe. Through formation of the first mask layers 15 there forms a region 8PS1, masked by the first mask layers 15, and a region 8PS2, not masked by the first mask layers 15, on the stacking surface 8PS of the metal layer 8P.

Figure 10A:
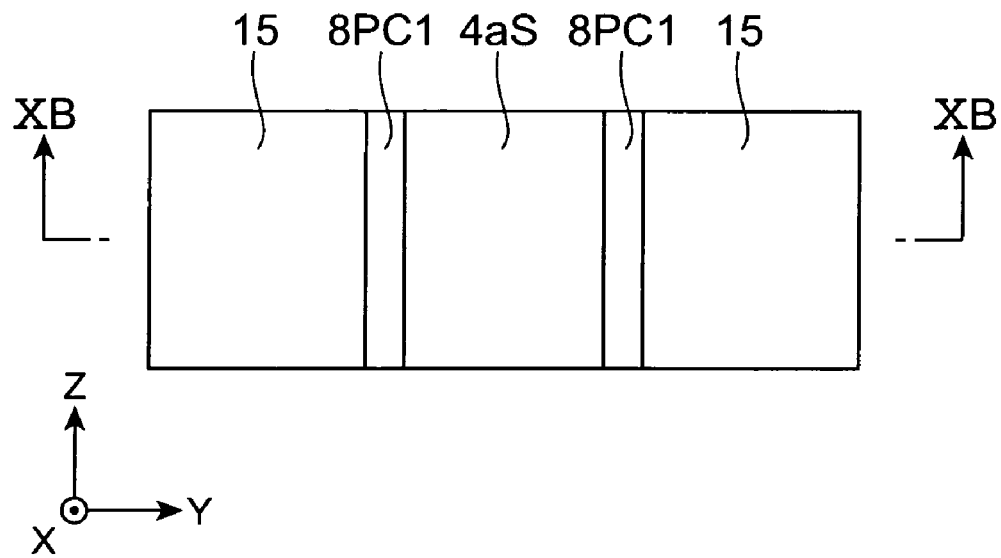
FIG. 10A is a plan-view diagram of an intermediate of the thermally assisted magnetic head, for explaining a manufacturing method thereof.
Figure 10B:
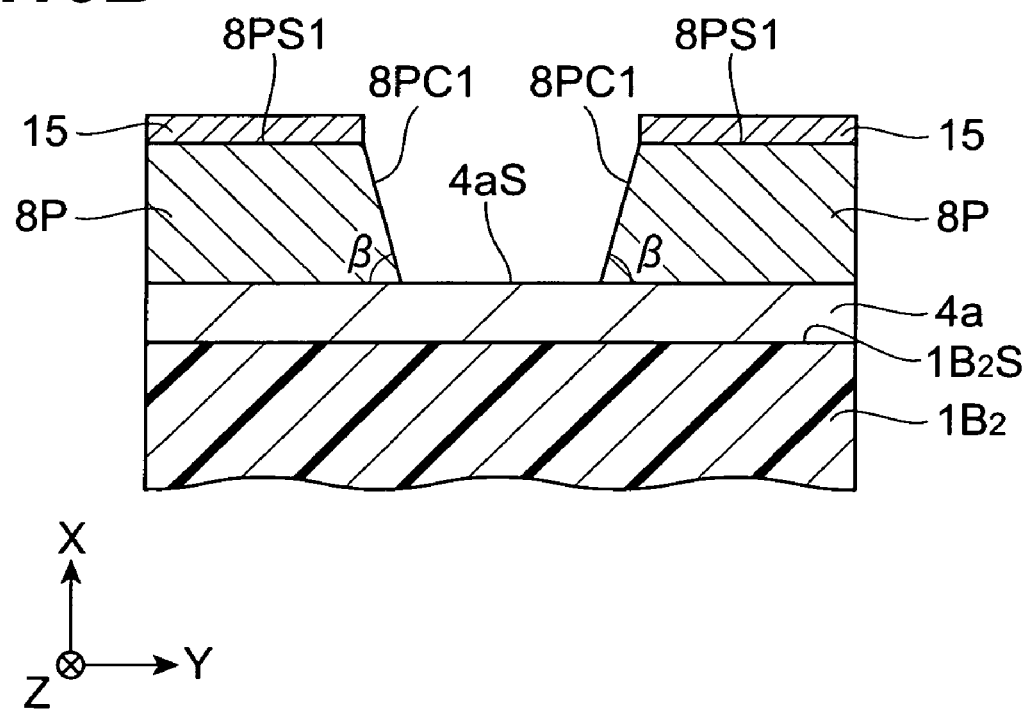
FIG. 10B is a cross-sectional diagram of an intermediate of the thermally assisted magnetic head, for explaining a manufacturing method thereof.

The non-masked region 8PS2 of the metal layer 8P is then etched by dry etching, for instance by ion milling using argon ions. The metal layer 8P is etched thereupon in such a manner that the cross section thereof slants away from the first mask layers 15, on account of the shadow effect of the latter, to expose thereby a portion of a stacking surface 4aS of the insulating layer 4a, as illustrated in FIGS. 10A and 10B. In the metal layer 8P there form, as a result, first inclined surfaces 8PC1 extending from the regions 8PS1 to the insulating layer 4a. The interior angle β, defined by the stacking surface 4aS of the insulating layer 4a and the first inclined surfaces 8PC1, is controlled by adjusting the thickness of the first mask layers 15 and the dry etching conditions, for instance the bombardment angle of the argon ions during etching of the metal layer 8P by ion milling (incidence angle of argon ions onto the stacking surface 8PS of the metal layer 8P). The interior angle β yields thereafter the interior angle β of the second vertex 8B of the plasmon antenna 8, as viewed from a direction perpendicular to the medium-facing surface (FIG. 7). When the insulating layer 4a is not provided, the first inclined surfaces 8PC1 extend from the regions 8PS1 to the stacking surface $1B_2S$ of the insulator layer $1B_2$, such that the interior angle β is defined by the first inclined surfaces 8PC1 and the stacking surface $1B_2S$ of the insulator layer $1B_2$.

Figure 11A:
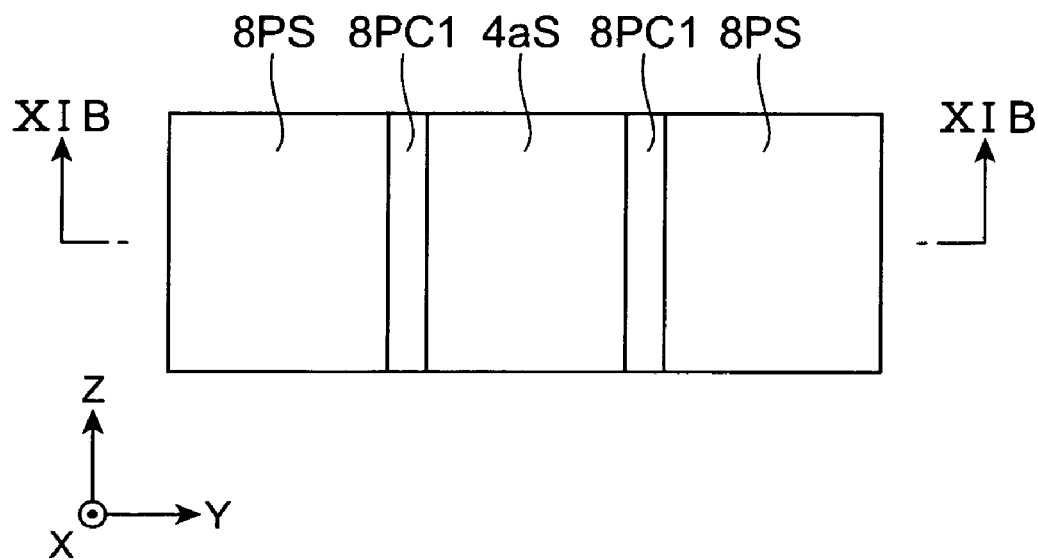
FIG. 11A is a plan-view diagram of an intermediate of the thermally assisted magnetic head, for explaining a manufacturing method thereof.
Figure 11B:
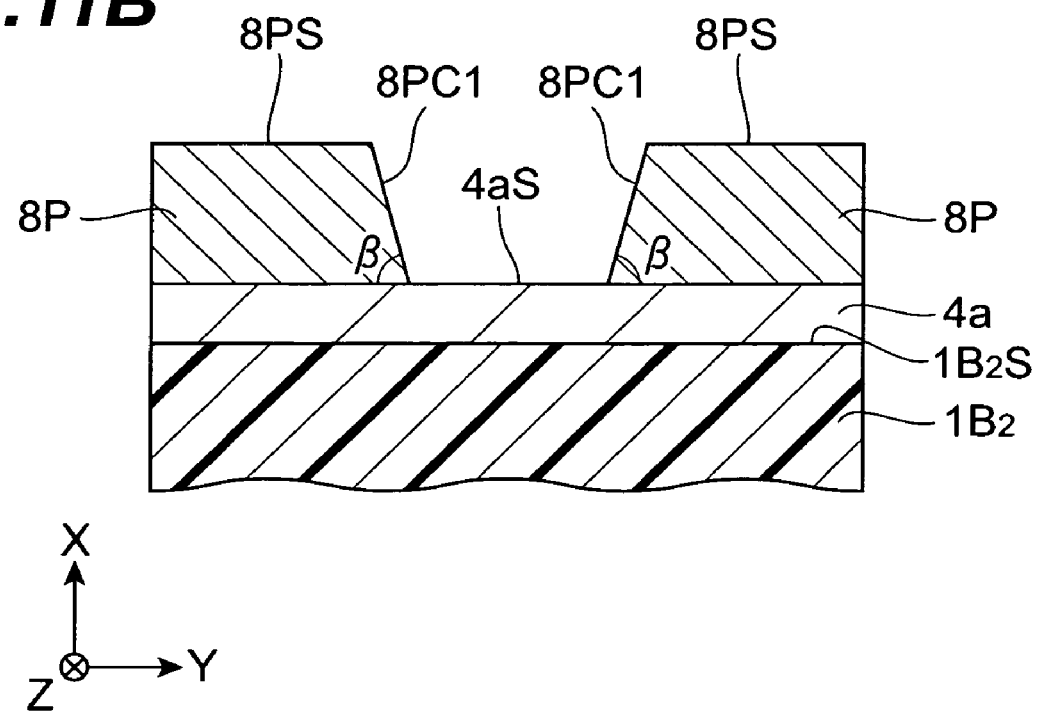
FIG. 11B is a cross-sectional diagram of an intermediate of the thermally assisted magnetic head, for explaining a manufacturing method thereof.

The first mask layers 15 on the regions 8PS1 are removed then by reactive ion etching (RIE), for instance using $CF_4$ as an etching gas. The first inclined surfaces 8PC1 and the stacking surface 8PS of the metal layer 8P become exposed as a result, as illustrated in FIGS. 11A and 11B.

Figure 12A:
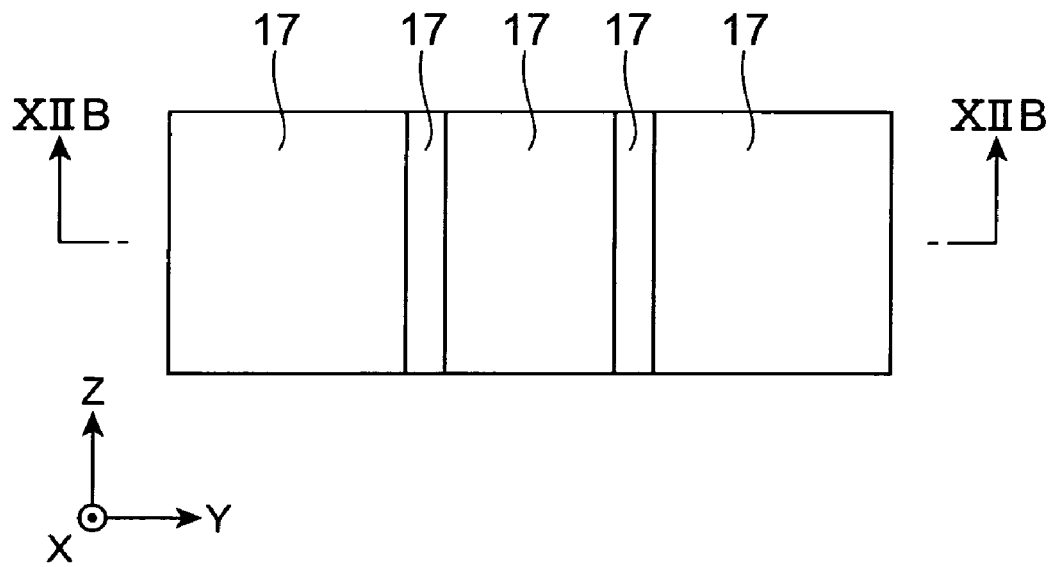
FIG. 12A is a plan-view diagram of an intermediate of the thermally assisted magnetic head, for explaining a manufacturing method thereof.
Figure 12B:
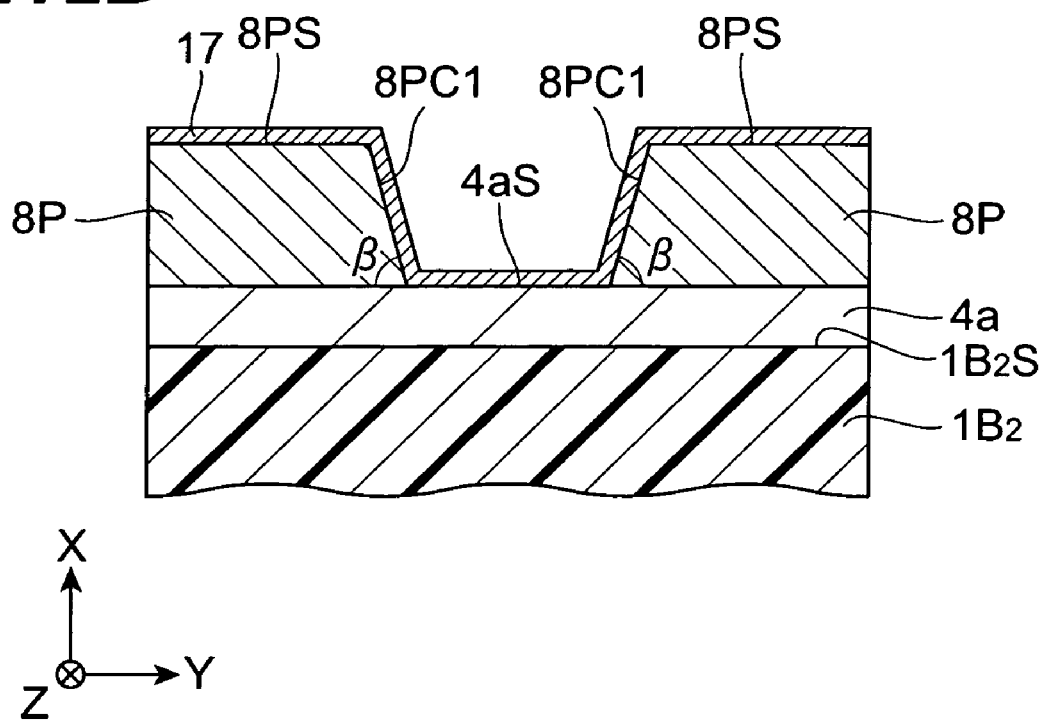
FIG. 12B is a cross-sectional diagram of an intermediate of the thermally assisted magnetic head, for explaining a manufacturing method thereof.

A second mask layer 17 is formed next, for instance by sputtering, on the metal layer 8P and the exposed insulating layer 4a, as illustrated in FIGS. 12A and 12B. The second mask layer 17 is formed thereby on the first inclined surfaces 8PC1 and the stacking surface 8PS of the metal layer 8P. The thickness of the second mask layer 17 is, for instance, 12 to 75 nm. The second mask layer 17 can have a two-layer structure comprising a metal layer and an oxide layer that are layered in this order from the metal layer 8P and the insulating layer 4a. The metal layer and the oxide layer of the second mask layer 17 can be, for instance, a Ta layer and a $TaO_x$ layer. The second mask layer 17 may be made of a metal layer alone, comprising Ta, NiFe or the like.

Figure 13A:
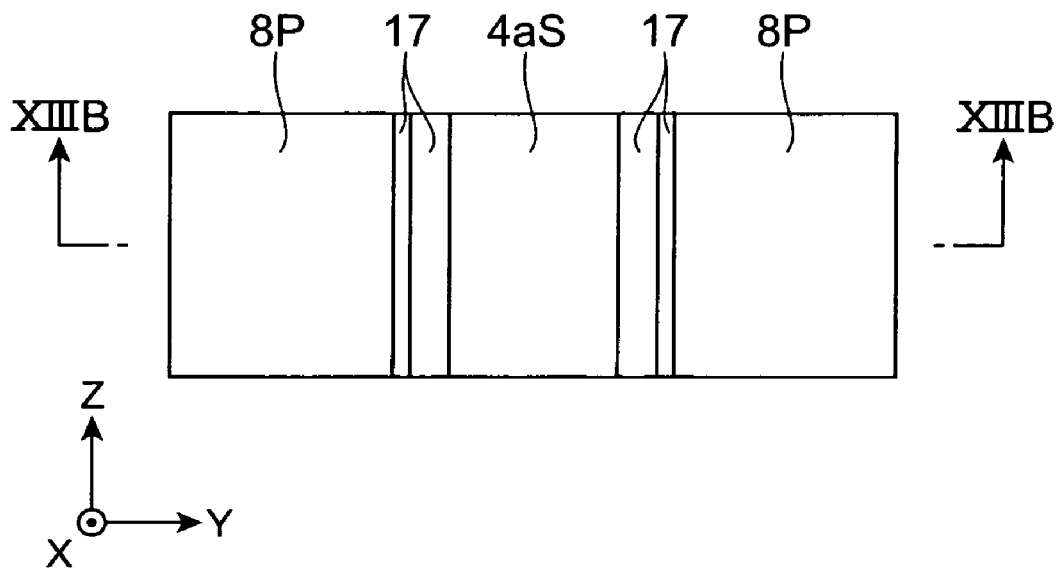
FIG. 13A is a plan-view diagram of an intermediate of the thermally assisted magnetic head, for explaining a manufacturing method thereof.
Figure 13B:
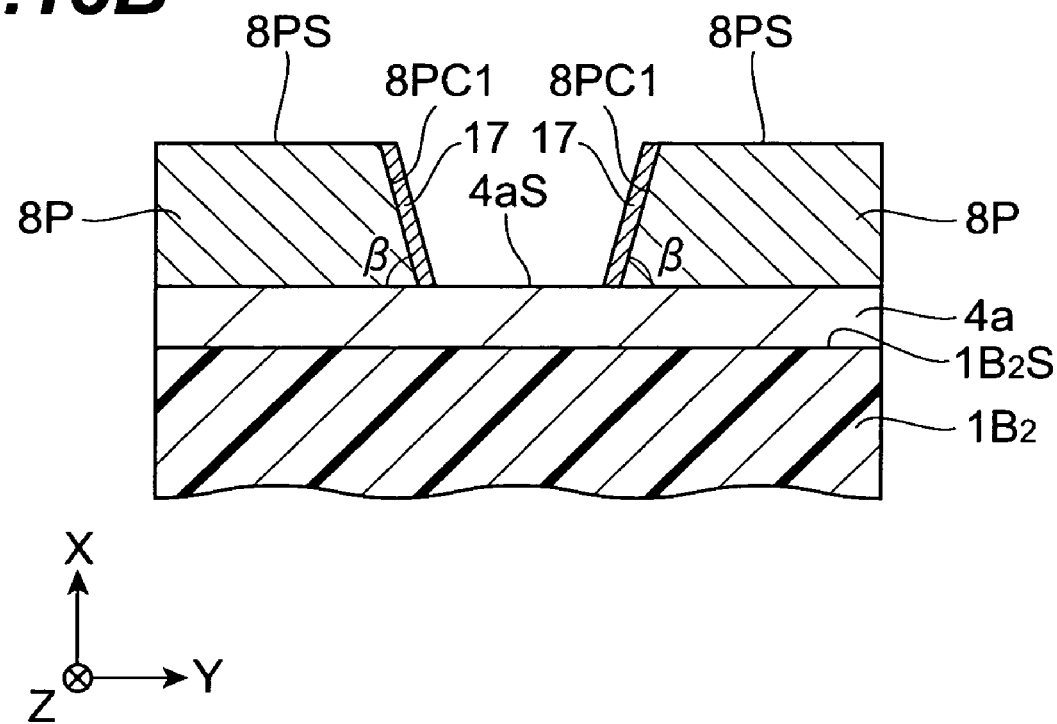
FIG. 13B is a cross-sectional diagram of an intermediate of the thermally assisted magnetic head, for explaining a manufacturing method thereof.

Next, the second mask layer 17 is removed from the stacking surface 8PS of the metal layer 8P, but leaving the second mask layer 17 on the first inclined surfaces 8PC1 remained, as illustrated in FIGS. 13A and 13B, through etching the second mask layer 17, for instance by dry etching such as ion milling using argon ions. The etching rate of the second mask layer 17 on the stacking surface 8PS and the stacking surface 4aS can be made different from the etching rate of the second mask layer 17 on the first inclined surfaces 8PC1 by appropriately adjusting conditions during dry etching, for instance by adjusting the bombardment angle of the argon ions during etching of the second mask layer 17 by ion milling (incidence angle of argon ions onto the stacking surface 8PS of the metal layer 8P). As a result, the second mask layer 17 can be removed from the stacking surface 8PS of the metal layer 8P while remaining on the first inclined surfaces 8PC1, as described above. The incidence angle of the argon ions onto the stacking surface 8PS of the metal layer 8P during etching of the second mask layer 17 by ion milling ranges, for instance, from 30 to 60 degrees.

Preferably, the slider substrate 1A (FIG. 4) on which the metal layer 8P and so forth are formed is rotated, around an axis of rotation that runs along the X-axis, during etching of the second mask layer 17 by dry etching. Doing so allows achieving a desired ion incidence angle and desired incidence duration, on the basis of which the amount of etching can be controlled accurately.

Figure 14A:
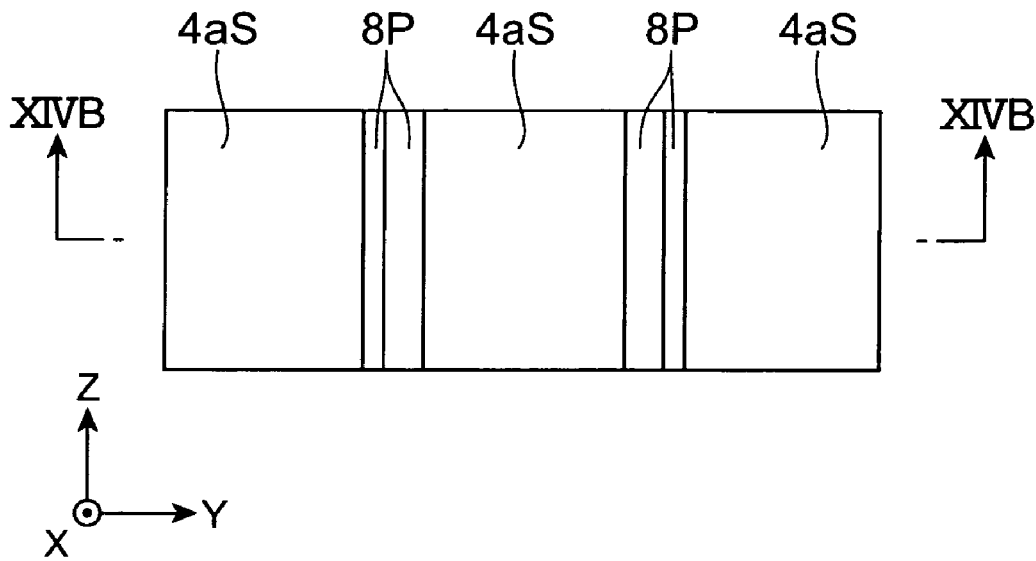
FIG. 14A is a plan-view diagram of an intermediate of the thermally assisted magnetic head, for explaining a manufacturing method thereof.
Figure 14B:
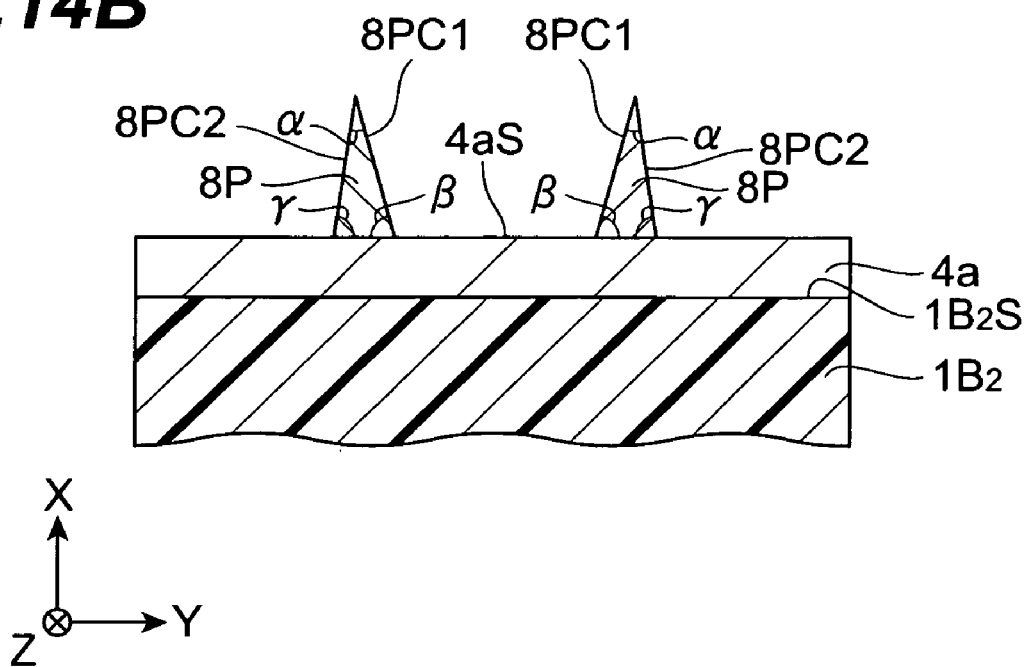
FIG. 14B is a cross-sectional diagram of an intermediate of the thermally assisted magnetic head, for explaining a manufacturing method thereof.

The metal layer 8P is etched next by dry etching, for instance by ion milling with argon ions, using as a mask the second mask layer 17 remaining on the first inclined surfaces 8PC1, as illustrated in FIGS. 14A and 14B. The second mask layer 17 remaining on the first inclined surfaces 8PC1 is removed thereby while second inclined surfaces 8PC2 are formed extending from the first inclined surfaces 8PC1 to the insulating layer 4a on the metal layer 8P. The above is achieved by appropriately deciding the combination of materials that make up the metal layer 8P and the second mask layer 17, and appropriately setting various conditions during dry etching of the metal layer 8P, in such a manner so as to ensure an appropriate ratio between the etching rates of the materials that form the metal layer 8P and the second mask layer 17. The interior angle α is defined by the first inclined surfaces 8PC1 and the second inclined surfaces 8PC2, and the interior angle γ is defined by the second inclined surfaces 8PC2 and the stacking surface 4aS of the insulating layer 4a. The magnitude of the interior angles α and γ is controlled by adjusting the dry etching conditions, for instance the bombardment angle of the argon ions during etching of the metal layer 8P by ion milling (incidence angle of argon ions onto the stacking surface 8PS of the metal layer 8P). The interior angle α yields thereafter the interior angle α of the first vertex 8A in the plasmon antenna 8, while the interior angle γ yields thereafter the interior angle γ of the third vertex 8C of the plasmon antenna 8, as viewed from a direction perpendicular to the medium-facing surface (FIG. 7). The second mask layer 17 may remain on the first inclined surfaces 8PC1 during formation of the second inclined surfaces 8PC2 on the metal layer 8P, through etching of the metal layer 8P to be the plasmon antenna.

Preferably, the slider substrate 1A (FIG. 4) on which the metal layer 8P and so forth are formed is rotated, around an axis of rotation that runs along the X-axis, during etching of the metal layer 8P. Doing so allows achieving a desired ion incidence angle and desired incidence duration, on the basis of which the amount of etching can be controlled accurately. The metal layer 8P, to be the plasmon antenna 8, is thus fabricated into a pair of triangular prisms, as viewed from a direction perpendicular to the medium-facing surface S, i.e. the Z-axis direction. When the insulating layer 4a is not provided, the interior angle γ is defined by the second inclined surfaces 8PC2 and the stacking surface $1B_2S$ of the insulator layer $1B_2$.

Figure 15A:
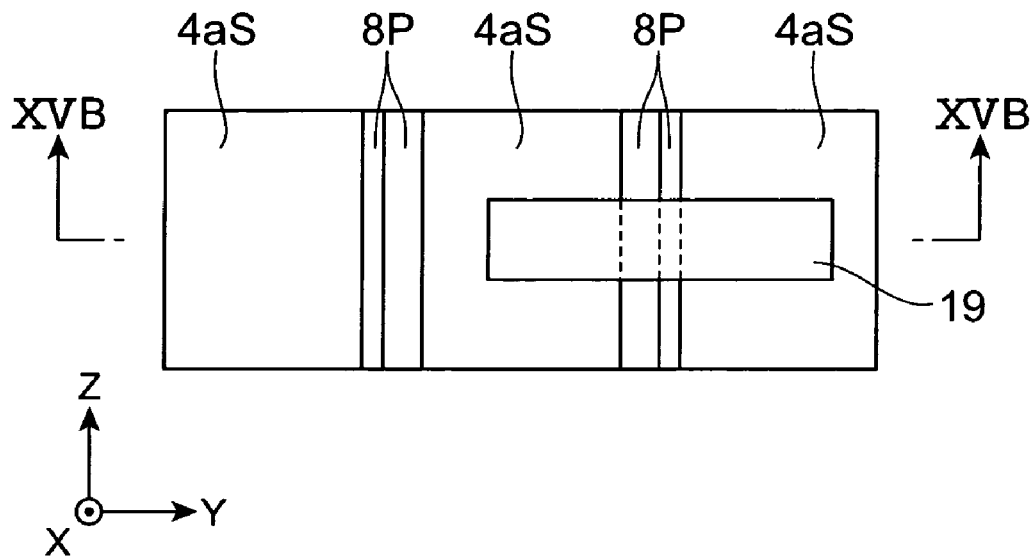
FIG. 15A is a plan-view diagram of an intermediate of the thermally assisted magnetic head, for explaining a manufacturing method thereof.
Figure 15B:
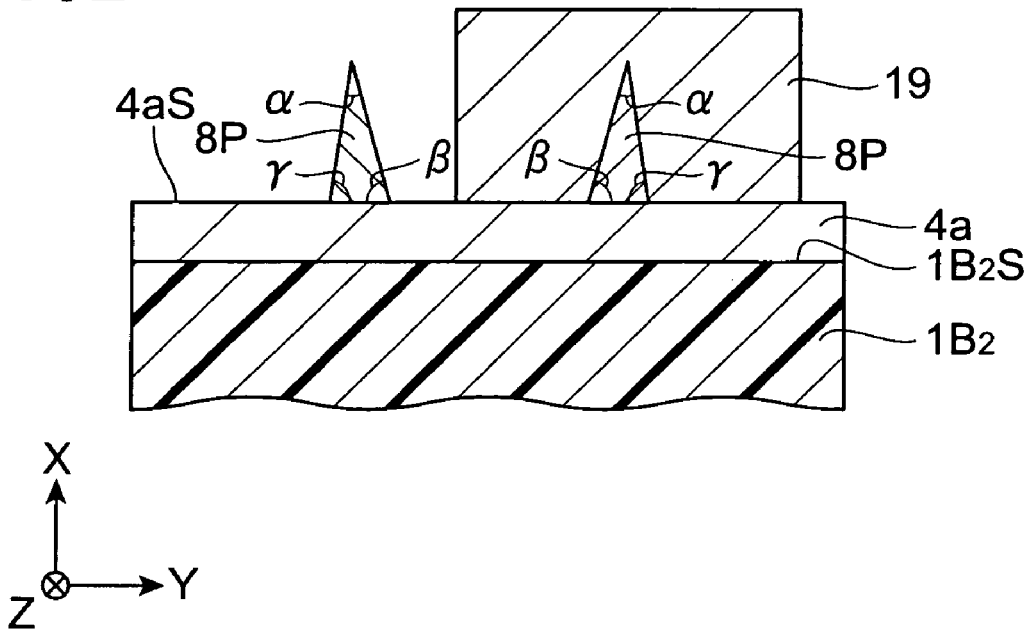
FIG. 15B is a cross-sectional diagram of an intermediate of the thermally assisted magnetic head, for explaining a manufacturing method thereof.

A resist layer 19 is formed next on one of the triangular prisms into which the metal layer 8P has been fabricated, with the resist layer 19 covering part of the triangular prism in the extension direction thereof, as illustrated in FIGS. 15A and 15B.

Figure 16A:
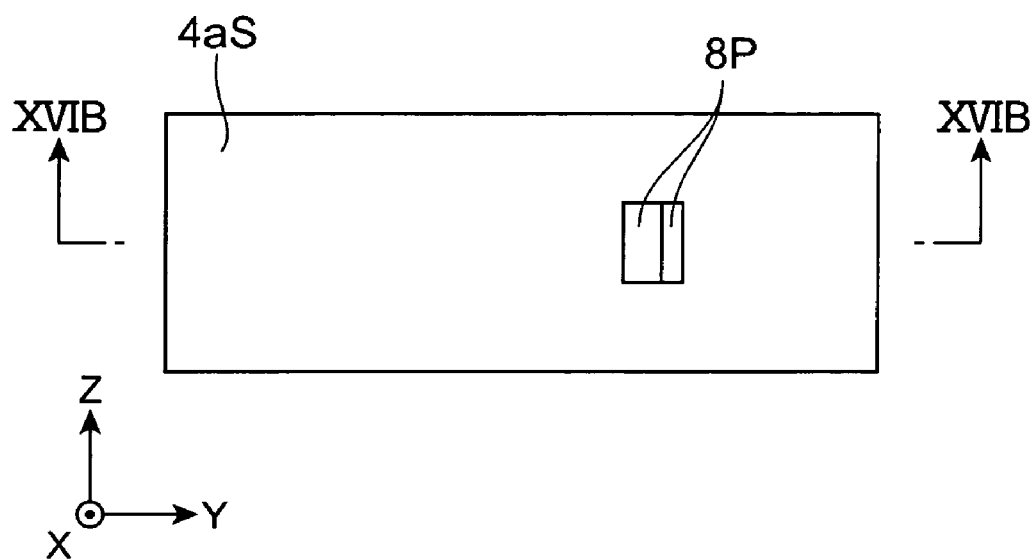
FIG. 16A is a plan-view diagram of an intermediate of the thermally assisted magnetic head, for explaining a manufacturing method thereof.
Figure 16B:
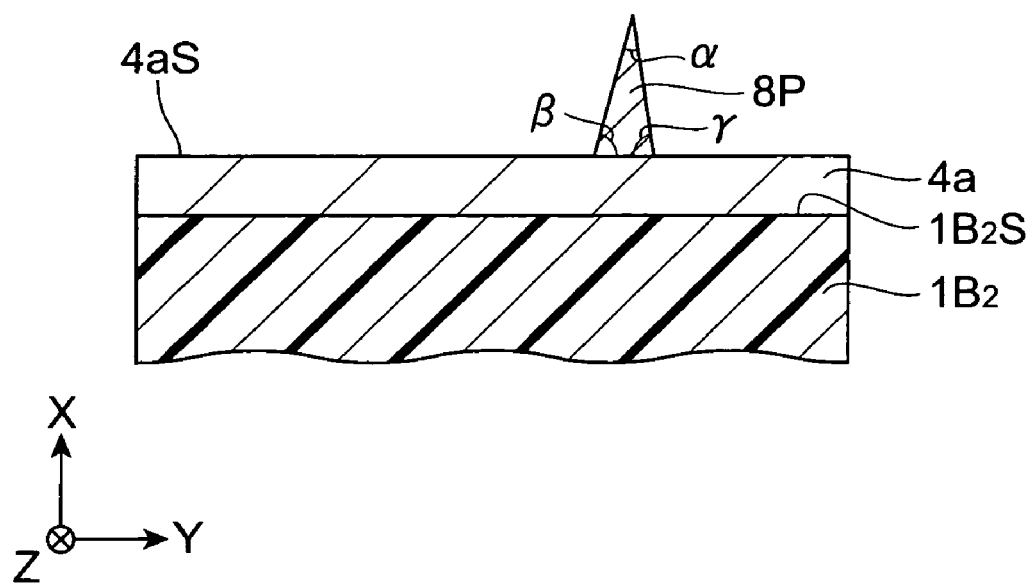
FIG. 16B is a cross-sectional diagram of an intermediate of the thermally assisted magnetic head, for explaining a manufacturing method thereof.

The area of the metal layer 8P not masked by the resist layer 19 is removed, as illustrated in FIGS. 16A and 16B, by dry etching, for instance by ion milling using argon ions. As a result, the metal layer 8P is fabricated into a triangular plate the thickness direction whereof is the Z-axis direction.

Figure 17A:
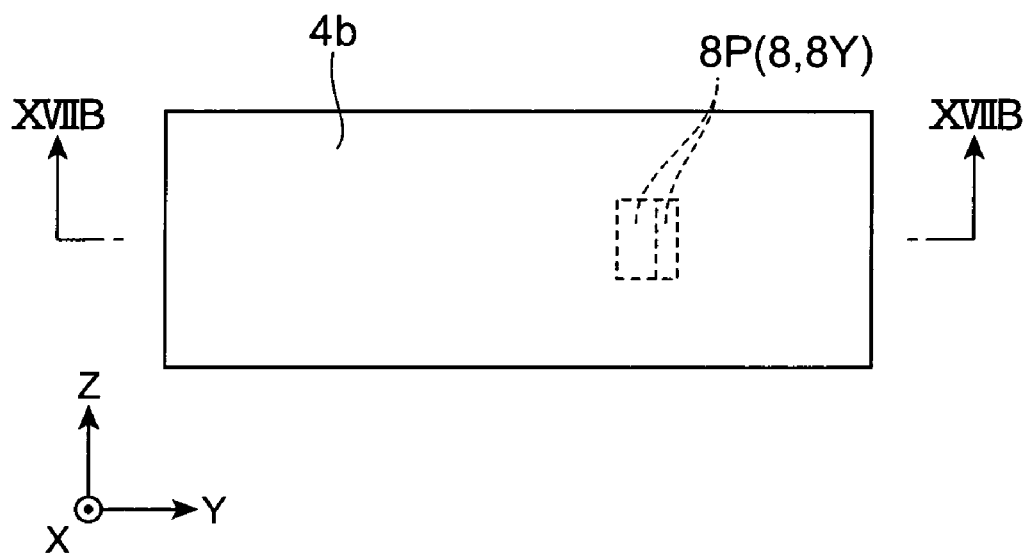
FIG. 17A is a plan-view diagram of an intermediate of the thermally assisted magnetic head, for explaining a manufacturing method thereof.
Figure 17B:
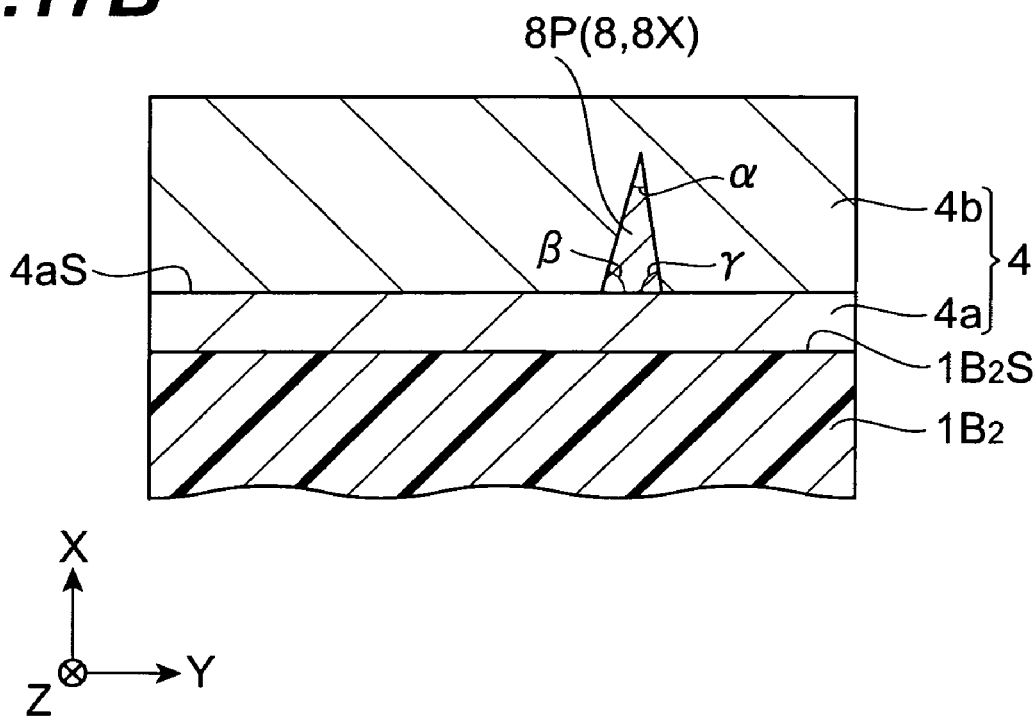
FIG. 17B is a cross-sectional diagram of an intermediate of the thermally assisted magnetic head, for explaining a manufacturing method thereof.

Thereafter, an insulating layer 4b comprising the same material as the insulating layer 4a is formed, for instance by sputtering, over the entire surface, followed by flattening of the top, as illustrated in FIGS. 17A and 17B. The insulating layer 4a and the insulating layer 4b make up the core 4. The metal layer 8P, fabricated as described above, becomes the plasmon antenna 8. As illustrated in FIG. 4, the plasmon antenna 8 has a front face 8X on the XY plane, corresponding to the medium-facing surface S, and side faces 8Y that define the thickness of the plasmon antenna 8 in the Z-axis direction.

The main magnetic pole 6A, the coil 5, the magnetic material layer 6B, the overcoat layer 1B$_3$ and so forth are formed on the core 4 in accordance with known methods. The slider substrate 1A is sliced in the XY plane to manufacture a slider bar having the medium-facing surface S (FIG. 4). The MR height of the MR element 7 (length in the direction perpendicular to the medium-facing surface S) and the thickness T8 of the plasmon antenna 8 (FIG. 6) are adjusted to a predetermined size by lapping the medium-facing surface S in the positive direction of the Z-axis. The slider bar is then divided into individual elements, and the light source unit 2, having mounted thereon the light-emitting element 3, is bonded to the slider substrate 1A of the slider 1, to complete the thermally assisted magnetic head (FIG. 4).

In the above manufacturing method, a pair of first mask layers 15 is formed on the metal layer 8P (FIG. 9A, FIG. 9B) to shape the metal layer 8P into a pair of triangular prisms extending in the Z-axis direction (FIG. 14A, FIG. 14B), after which one of the triangular prisms of the metal layer 8P is removed (FIG. 15A, FIG. 15B, FIG. 16A, FIG. 16B). However, there may also be formed one single first mask layer 15 on the metal layer 8P, to shape the metal layer 8P into one triangular prism extending in the Z-axis direction.

The effect of the present invention is further explained below by way of examples and comparative examples.

In the models of the plasmon antennas of the examples and comparative examples of the present invention, the intensity of near-field light emitted from the vicinity of respective vertices was calculated by simulation, to illustrate that the intensity of the near-field light generated at vertex A is stronger for an asymmetrical plan-view shape than for a symmetrical plan-view shape of the plasmon antenna.

Figure 18A:
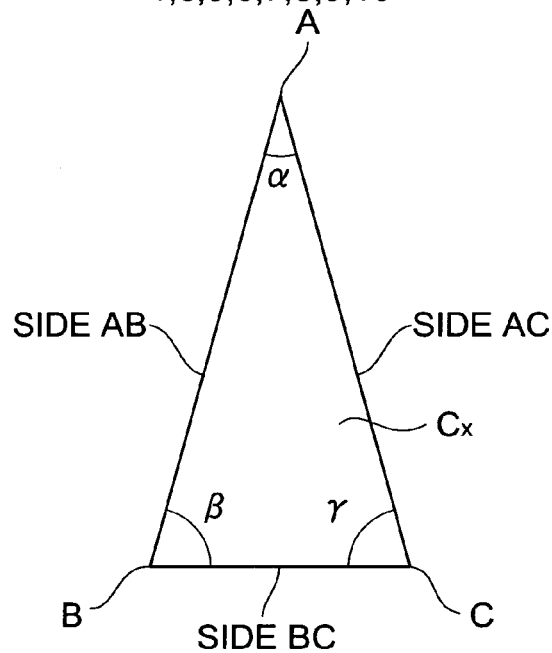
FIG. 18A is a plan-view diagram for explaining a plasmon antenna in a comparative example.
Figure 18B:
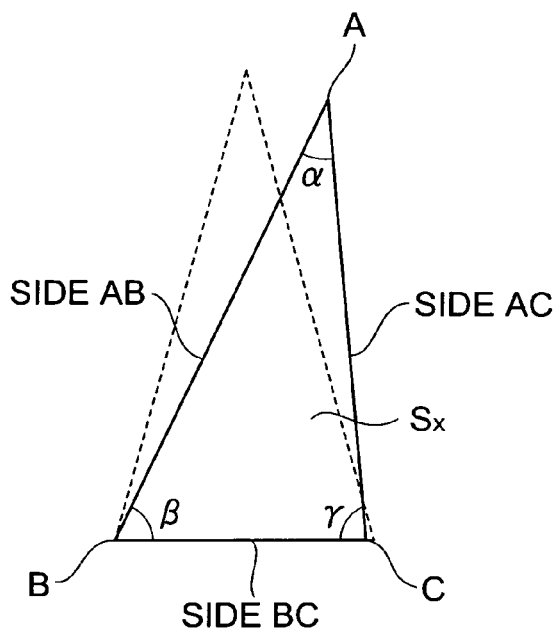
FIG. 18C is a plan-view diagram for explaining a plasmon antenna in a comparative example.

The plasmon antenna models in the examples and comparative examples are explained first. FIG. 18A is a plan-view diagram for explaining the shape of the plasmon antennas of Comparative Examples 1, 3 and 5 to 10; FIG. 18B is a plan-view diagram for explaining the shape of the plasmon antennas of Examples 1 to 24; and FIG. 18C a plan-view diagram for explaining the shape of the plasmon antennas of Comparative Examples 2 and 4. The plasmon antennas of Comparative Examples 1 to 10 and Examples 1 to 24 have a vertex A, a vertex B and a vertex C. The interior angle of vertex A is $\alpha$, the interior angle of vertex B is $\beta$ and the interior angle of vertex C is $\gamma$. The plasmon antennas of Comparative Examples 1 to 10 and Examples 1 to 24 have a side AB joining vertex A to vertex B, a side BC joining vertex B to vertex C, and a side AC joining vertex A to vertex C. Vertices A, B and C in the plasmon antennas of Examples 1 to 24 of FIG. 18B, correspond respectively to the first vertex 8A, the second vertex 8B and the third vertex 8C in the above-described embodiment. The interior angles $\alpha$, $\beta$ and $\gamma$ in the plasmon antennas of Examples 1 to 24 of FIG. 18B correspond respectively to the interior angle $\alpha$, the interior angle $\beta$ and the interior angle $\gamma$ in the above-described embodiment.

Figure 18C:
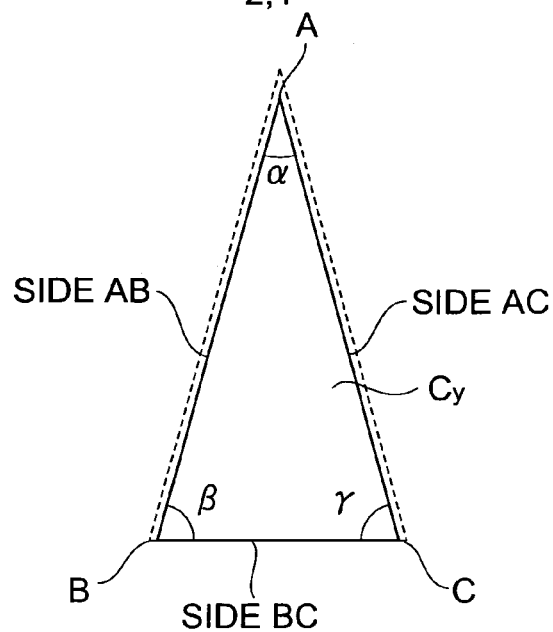

The plasmon antennas in the examples and comparative examples illustrated in FIG. 18A, FIG. 18B and FIG. 18C satisfy the conditions $\alpha<\beta$ and $\alpha<\gamma$, as a common condition of the respective plasmon antennas.

The plasmon antennas in Comparative Examples 1, 3 and 5 to 10 of FIG. 18A satisfy the condition $\beta=\gamma$. That is, the plan-view shape of the plasmon antennas in Comparative Examples 1, 3 and 5 to 10 of FIG. 18A exhibits bilateral symmetry relative to a perpendicular line drawn from vertex A to side BC.

The basic shape of the plasmon antennas of Examples 1 to 24 of FIG. 18B (denoted by a dotted line in FIG. 18B) is that of a plasmon antenna of Comparative Examples 1, 3 and 5 to 10 of FIG. 18A, with some deformation. Specifically, the plasmon antennas of Comparative Examples 1, 3 and 5 to 10 of FIG. 18A are deformed by reducing the interior angle $\beta$ through clockwise rotation of side AB around vertex B while keeping fixed the length of side AB and the interior angle $\alpha$. The intersection point of side AB and side AC yields then a new vertex C. The plasmon antennas of Examples 1 to 24 of FIG. 18B satisfy the relationship $\beta\neq\gamma$. That is, the plan-view shape of the plasmon antennas of Examples 1 to 24 of FIG. 18B exhibits bilateral asymmetry relative to a perpendicular line drawn from vertex A to side BC. The plasmon antennas satisfy also the relationship Cx>Sx wherein Cx denotes the surface area of a plan-view shape of a basic-shape plasmon antenna of the plasmon antennas in Comparative Examples 1, 3 and 5 to 10 of FIG. 18A, and Sx denotes the surface area of a plan-view shape of a plasmon antenna of Examples 1 to 24 in FIG. 18B. The way in which the intensity of near-field light generated by a plasmon antenna varies depending on the asymmetry of the plan-view shape of the plasmon antenna is studied by comparing the plasmon antennas of Examples 1 to 24 of FIG. 18B, and the plasmon antennas of Comparative Examples 1, 3 and 5 to 10 of FIG. 18A.

The plasmon antennas of Comparative Examples 2 and 4 of FIG. 18C are deformations of a basic shape corresponding to a plasmon antenna of Examples 1 to 24 of FIG. 18B. Specifically, a plasmon antenna of Examples 1 to 24 of FIG. 18B is deformed by modifying the length of sides AB, BC and AC while keeping the interior angle $\alpha$ constant, in such a manner that $\beta=\gamma$, and so that the surface area of the plan-view shape of the plasmon antenna after deformation Cy is equal to Sx. That is, the surface area of a basic-shape plasmon antenna of Examples 1 to 24 of FIG. 18B is identical to the surface area of the plan-view shape of the plasmon antenna of Comparative Examples 2 and 4 of FIG. 18C, obtained through deformation of the respective basic-shape plasmon antenna. Thus, the plasmon antennas of Comparative Example 2 and 4 of FIG. 18C have the same interior angles $\alpha$, $\beta$ and $\gamma$, but shorter sides AB, BC and AC, than a basic-shape plasmon antenna (denoted by a broken line in FIG. 18C) in Comparative Examples 1, 3 and 5 to 10 of FIG. 18A. Therefore, the plan-view shape of the plasmon antennas of Comparative Examples 2 and 4 of FIG. 18C is bilaterally symmetrical relative to a perpendicular line drawn from vertex A to side BC. As described above, the relationship between the intensity of near-field light generated by the plasmon antenna and the asymmetry of the plan-view shape of the plasmon antenna is studied by comparing the plasmon antennas of Comparative Examples 1, 3 and 5 to 10 of FIG. 18A and the plasmon antennas of Examples 1 to 24 of FIG. 18B. However, the surface areas of the plan-view shape of the plasmon antennas of Comparative Examples 1, 3 and 5 to 10 of FIG. 18A is different from that of the plasmon antennas of Examples 1 to 24 of FIG. 18B. Therefore, near-field light emission intensity was also simulated in Comparative Examples 2 and 4 of FIG. 18C, to compare a plasmon antenna of Examples 1 to 24 of FIG. 18B with a plasmon antenna of the Comparative Examples 2 or 4 of FIG. 18C, in order to elucidate thereby whether the difference in near-field light emission characteristics of Comparative Examples 1, 3 and 5 to 10 of FIG. 18A and Examples 1 to 24 of FIG. 18B arises from asymmetry or from differences in surface area of the plan-view shape of the plasmon antennas.

There were thus modeled the shapes of plasmon antennas of the comparative examples, having a basic shape illustrated in FIG. 18A, plasmon antennas of the examples, having the shapes illustrated in FIG. 18B and resulting from deformation of the former, and plasmon antennas of the comparative examples illustrated in FIG. 18C, resulting from deformation of the plasmon antennas of the examples having the shapes illustrated in FIG. 18B, for an angle α of given size. The above modeling was carried out for a plurality of sizes of the angle α, to model thereby the shapes of the plasmon antennas of Examples 1 to 24 and Comparative Examples 1 to 10. The material of the plasmon antennas of Examples 1 to 24 and Comparative Examples 1 to 10 was Au or Ag.

The intensity of near-field light emitted by respective vertices in the plasmon antennas of Examples 1 to 24 and Comparative Examples 1 to 10 was calculated by simulation. As conditions of the simulation, the distance from a light incidence surface (equivalent to the light incidence surface 4A of FIG. 4) to the plasmon antenna was kept constant, and the center of the light incidence surface coincided with the center of the plan-view shape of the plasmon antenna. The excitation light striking the plasmon antenna was a plane wave having a uniform intensity distribution. The near-field light emission intensity generated by the respective vertices of the plasmon antenna was computed by 3D-FDTD, segmenting the plasmon antenna into a 3 nm square mesh.

FIG. 19 illustrates the shape conditions of the plasmon antennas of Example 1, Example 2, Comparative Example 1 and Comparative Example 2. As illustrated in FIG. 19, the angle α was 30 degrees, and the material Au, in all the plasmon antennas of Example 1, Example 2, Comparative Example 1 and Comparative Example 2. The angle β in Example 1, Example 2, Comparative Example 1 and Comparative Example 2 was 70 degrees, 65 degrees, 75 degrees and 75 degrees, respectively. The length of side AB is 150 nm in Example 1, Example 2 and Comparative Example 1. Comparative Example 1 corresponds to the plasmon antenna of FIG. 18A. The length of side AB in Comparative Example 2 was 144 nm. The surface area of the plan-view shape of the plasmon antennas of Example 1, Example 2, Comparative Example 1 and Comparative Example 2, namely $S_1$, $S_2$, $C_1$ and $C_2$, satisfy the relationship $C_1 > S_1 > S_2 = C_2$. Comparative Example 2 corresponds to the plasmon antenna of FIG. 18C. The near-field light emission intensity generated by respective vertices of the plasmon antennas of the above examples and comparative examples was simulated for irradiation of excitation light having a wavelength of 500, 600, 650, 700, 800 and 900 nm.

Figure 21A:
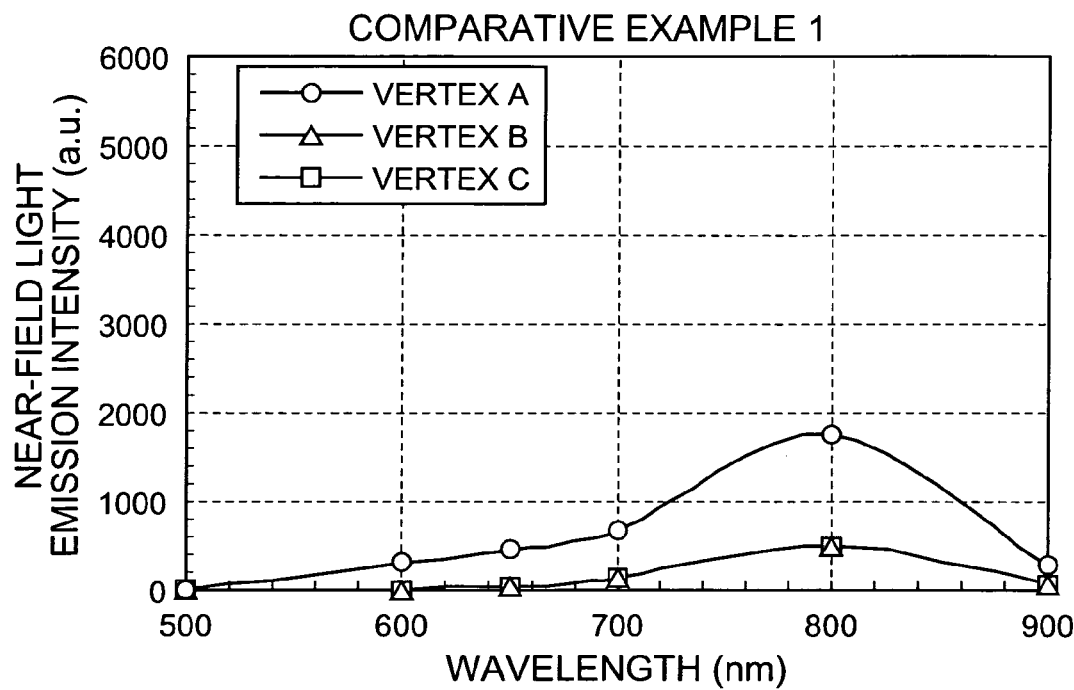
FIG. 21A is a diagram illustrating simulation results in Example 1.
Figure 21B:
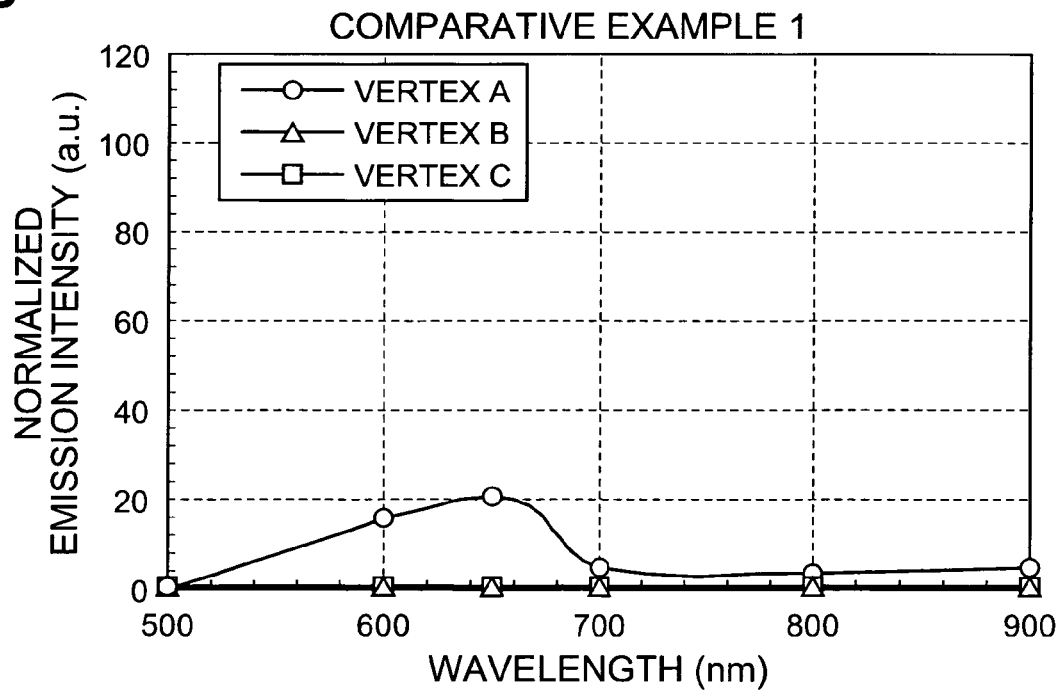
FIG. 21B is a diagram illustrating simulation results in Example 1.

FIG. 20A, FIG. 20B, FIG. 21A and FIG. 21B illustrate the results of the simulation of Comparative Example 1. FIG. 20A is a diagram illustrating the relationship between near-field light emission intensity generated by respective vertices of a plasmon antenna of Comparative Example 1, and the wavelength of the excitation light striking the plasmon antenna. The units of the near-field light emission intensity are arbitrary units. FIG. 20B is a diagram illustrating the results of the near-field light emission intensity illustrated in FIG. 20A, normalized to the near-field light emission intensity of vertex B. FIG. 21A and FIG. 21B are diagrams illustrating the results of FIG. 20A and FIG. 20B, with the horizontal axis representing excitation light wavelength and the vertical axis representing near-field light emission intensity.

FIG. 20A, FIG. 20B, FIG. 21A and FIG. 21B show that in Comparative Example 1 illustrated in FIG. 18A, as the basic shape in Example 1 where the plan-view shape of the plasmon antenna exhibits bilateral symmetry, the near-field light emission intensity generated at vertex A was stronger than the near-field light emission intensity generated at vertices B and C. Thus, the intensity of the near-field light generated at vertex A, which is the sharpest vertex, was strongest among the near-field light generated at the various vertices.

Figure 23A:
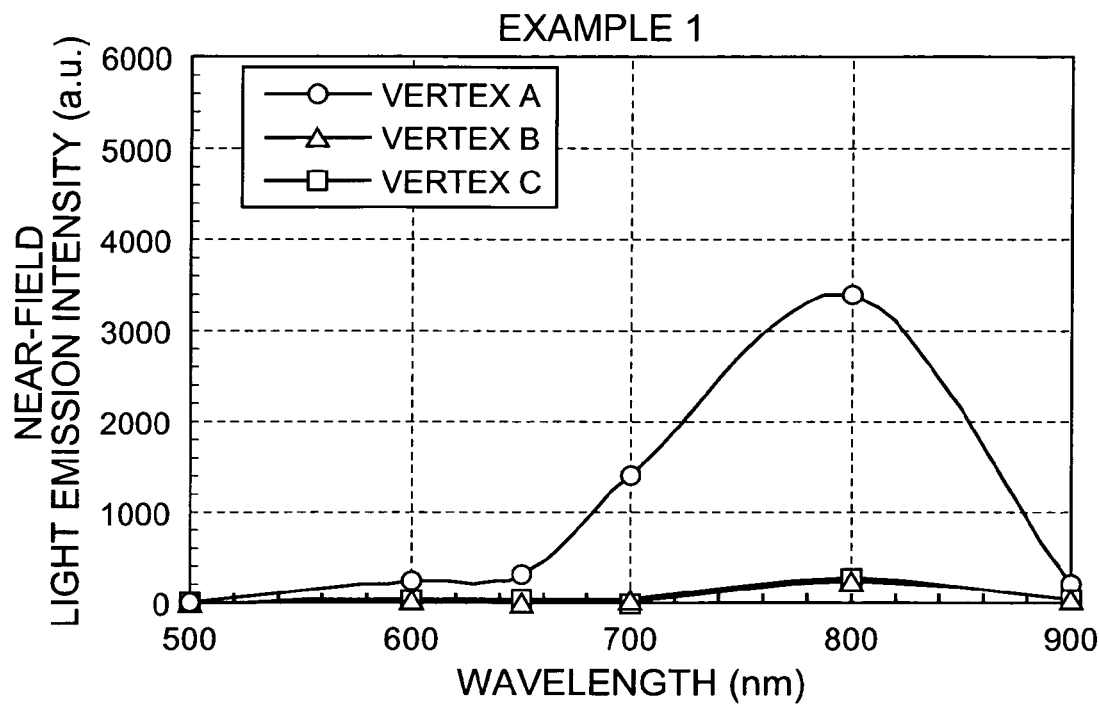
FIG. 23A is a diagram illustrating simulation results in Example 2.
Figure 23B:
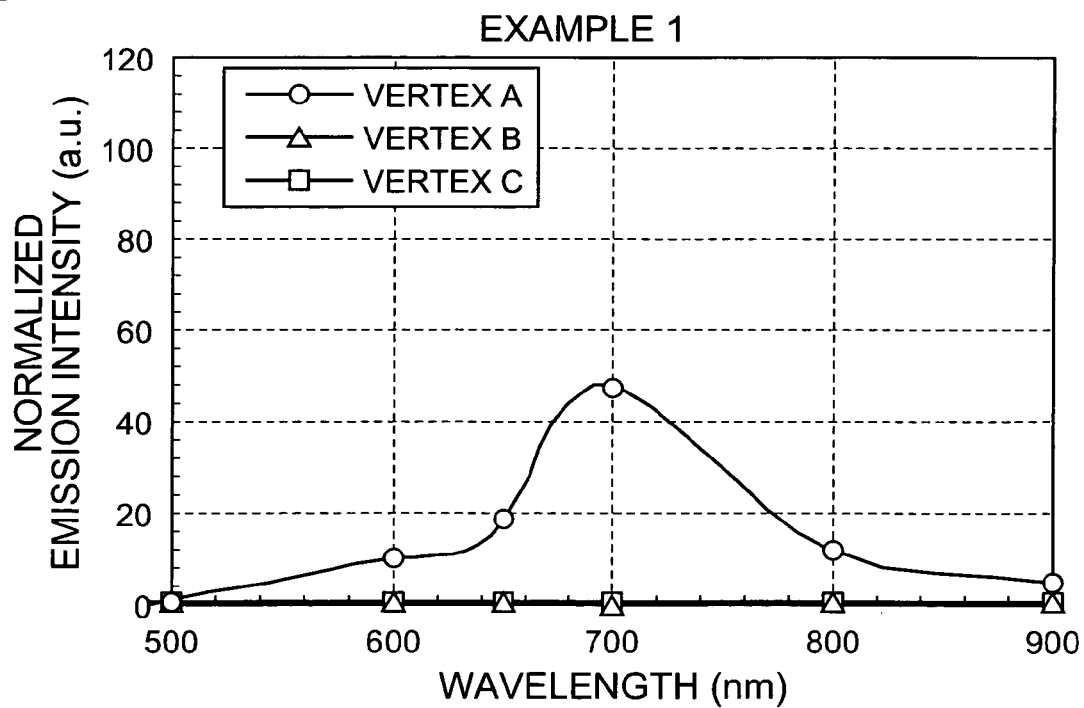
FIG. 23B is a diagram illustrating simulation results in Example 2.

FIG. 22A, FIG. 22B, FIG. 23A and FIG. 23B illustrate the results of the simulation of Example 1 illustrated in FIG. 18B, in which the plan-view shape of the plasmon antenna exhibits bilateral asymmetry through deformation of the basic shape of Comparative Example 1. FIG. 22A is a diagram illustrating the relationship between near-field light emission intensity generated by respective vertices of a plasmon antenna of Example 1, and the wavelength of the excitation light striking the plasmon antenna. The units of the near-field light emission intensity are arbitrary units. FIG. 22B is a diagram illustrating the results of the near-field light emission intensity illustrated in FIG. 22A, normalized to the near-field light emission intensity of vertex B. FIG. 23A and FIG. 23B are diagrams illustrating the results of FIG. 22A and FIG. 22B, with the horizontal axis representing excitation light wavelength and the vertical axis representing near-field light emission intensity.

FIG. 22A, FIG. 22B, FIG. 23A and FIG. 23B show that in Example 1 the near-field light emission intensity generated at vertex A was stronger, and the near-field light emission intensity generated at vertices B and C was weaker, than those of Comparative Example 1. In Example 1, the relative intensity of near-field light emission generated at vertex A relative to the near-field light emission intensity generated a vertex B was stronger than was the case in Comparative Example 1. Although the size of the angle α was identical in the plasmon antennas of Example 1 and Comparative Example 1, the respective near-field light emission intensities generated at vertex A and vertex B exhibited the above differences. This revealed, therefore, that the near-field light emission intensity generated at vertex A, which is the sharpest vertex, is stronger, and the near-field light emission intensity generated at the vertices B and C weaker, for an asymmetrical plan-view shape than for a symmetrical plan-view shape of the plasmon antenna.

Figure 25A:
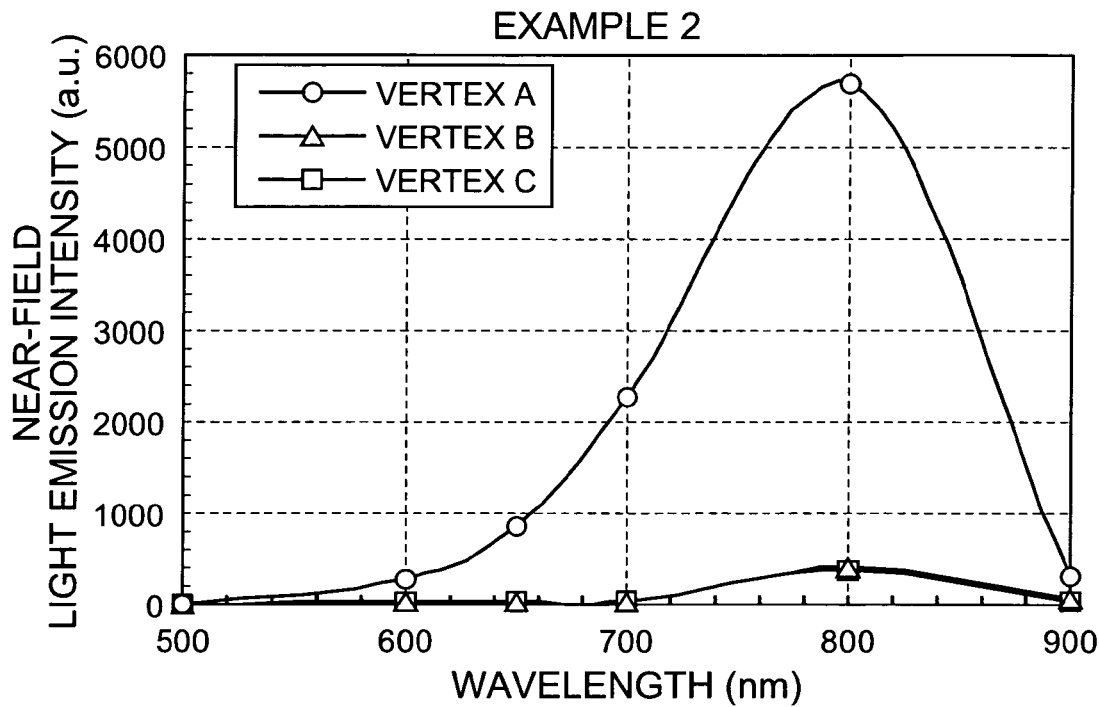
FIG. 25A is a diagram illustrating simulation results in Comparative Example 1.
Figure 25B:
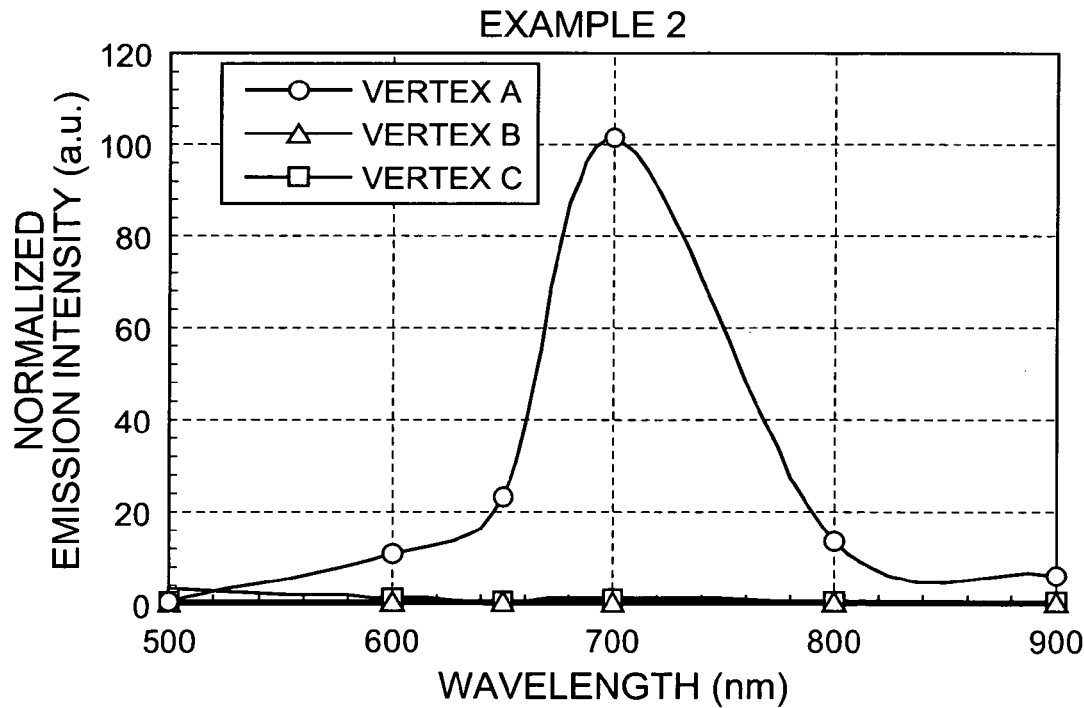
FIG. 25B is a diagram illustrating simulation results in Comparative Example 1.

FIG. 24A, FIG. 24B, FIG. 25A and FIG. 25B illustrate the results of the simulation of Example 2, in which the plan-view shape of the plasmon antenna exhibits bilateral asymmetry, with a smaller angle β than in Comparative Example 1. FIG. 24A is a diagram illustrating the relationship between near-field light emission intensity generated by respective vertices of a plasmon antenna of Example 2, and the wavelength of the excitation light striking the plasmon antenna. The units of the near-field light emission intensity are arbitrary units. FIG. 24B is a diagram illustrating the results of the near-field light emission intensity illustrated in FIG. 24A, normalized to the near-field light emission intensity of vertex B. FIG. 25A and FIG. 25B are diagrams illustrating the results of FIG. 24A and FIG. 24B, with the horizontal axis representing excitation light wavelength and the vertical axis representing near-field light emission intensity.

As illustrated in FIG. 24A, FIG. 24B, FIG. 25A and FIG. 25B, in Example 2, the near-field light emission intensity generated at vertex A was yet stronger than that of Example 1, while the near-field light emission intensity generated at the vertices B and C was yet weaker than that of Example 1. Although the size of the angle α was identical in the plasmon antennas of Example 1 and Example 2, the respective near-field light emission intensities generated at vertex A and vertex B exhibited the above differences. This revealed, therefore, that, a more asymmetrical plan-view shape of the plasmon antenna results in a stronger near-field light emission intensity generated at vertex A, which is the sharpest vertex, and a weaker near-field light emission intensity generated at the vertices B and C.

Figure 27A:
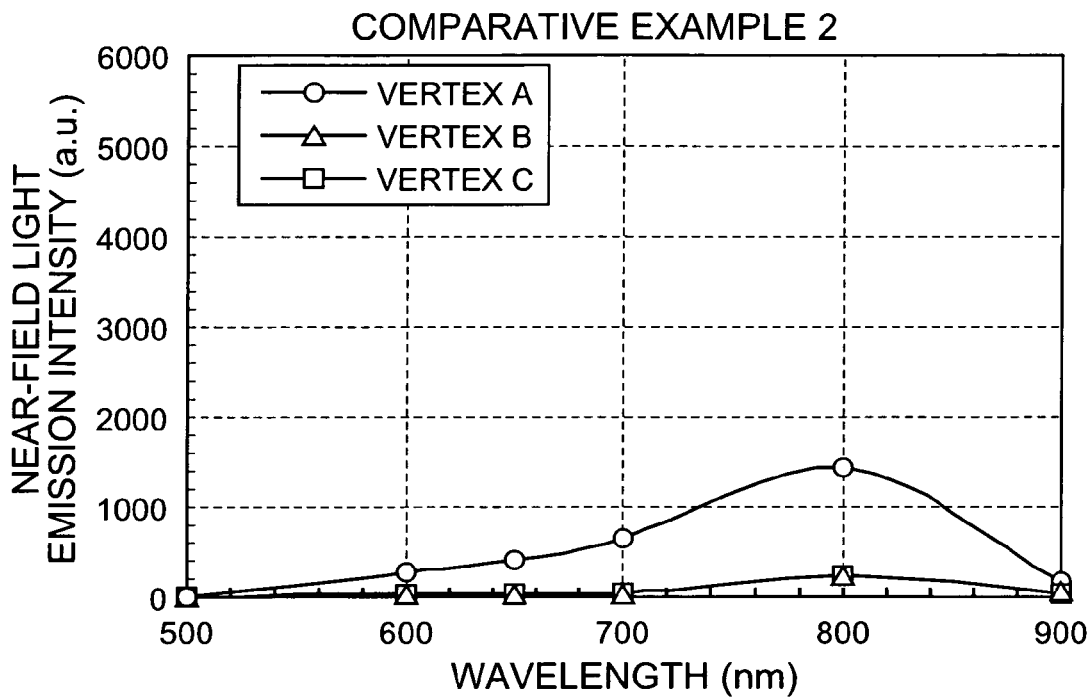
FIG. 27A is a diagram illustrating simulation results in Comparative Example 2.
Figure 27B:
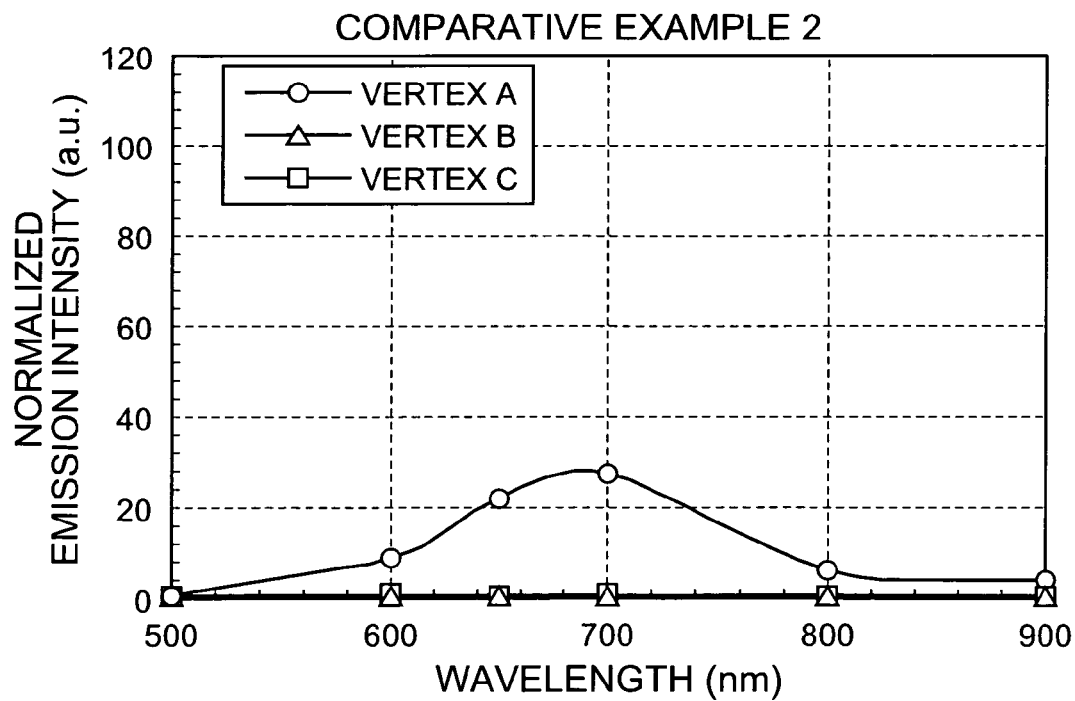
FIG. 27B is a diagram illustrating simulation results in Comparative Example 2.

FIG. 26A, FIG. 26B, FIG. 27A and FIG. 27B illustrate the results of the simulation of Comparative Example 2 illustrated in FIG. 18C, in which the plan-view shape of the plasmon antenna exhibits bilateral asymmetry through deformation of the basic shape of Example 1. The surface area of the plan-view shape of the plasmon antenna of Comparative Example 2 is identical to that of Example 2. FIG. 26A is a diagram illustrating the relationship between near-field light emission intensity generated by respective vertices of a plasmon antenna of Comparative Example 2, and the wavelength of the excitation light striking the plasmon antenna. The units of the near-field light emission intensity are arbitrary units. FIG. 26B is a diagram illustrating the results of the near-field light emission intensity illustrated in FIG. 26A, normalized to the near-field light emission intensity of vertex B. FIG. 27A and FIG. 27B are diagrams illustrating the results of FIG. 26A and FIG. 26B, with the horizontal axis representing excitation light wavelength and the vertical axis representing near-field light emission intensity.

FIG. 26A, FIG. 26B, FIG. 27A and FIG. 27B show that in Comparative Example 2 the near-field light emission intensity generated at vertex A was weaker, and than the near-field light emission intensity generated at vertices B and C was stronger, than those of Example 2, having an identical surface area of the plan-view shape of the plasmon antenna. These results indicated that the stronger near-field light emission intensity generated at vertex A, and the weaker near-field light emission intensity generated at the vertices B and C of the above-described Example 1 and Example 2, as compared with Comparative Example 1, arose not from a reduction in the surface area of the plan-view shape of the plasmon antenna, but from a higher asymmetry of the plan-view shape of the plasmon antenna.

Figure 28A:
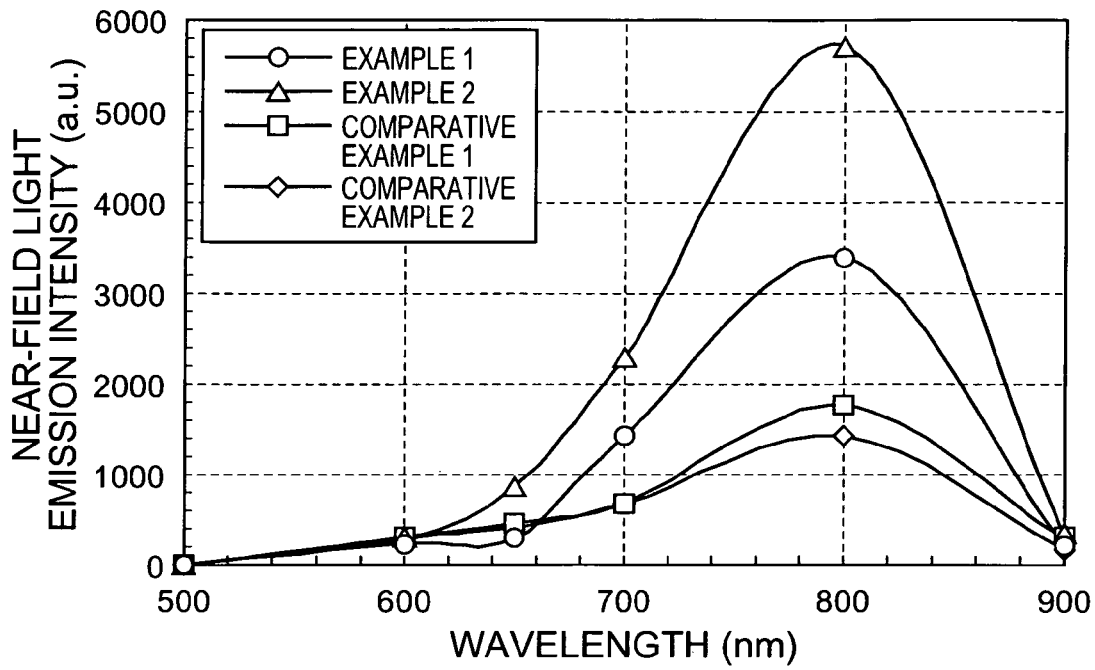
FIG. 28A is a diagram illustrating the dependence of near-field light intensity on the wavelength of excitation light, at vertex A, in Example 1, Example 2, Comparative Example 1 and Comparative Example 2.
Figure 28B:
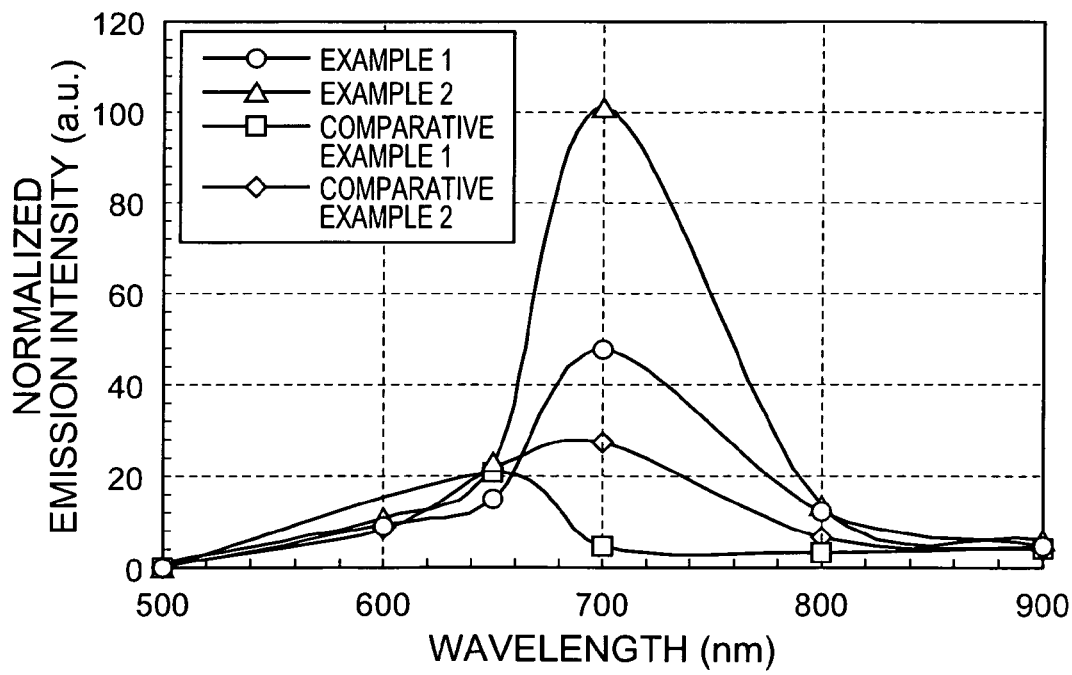
FIG. 28B is a diagram illustrating the dependence of near-field light intensity on the wavelength of excitation light, at vertex A, in Example 1, Example 2, Comparative Example 1 and Comparative Example 2, normalized to the near-field light emission intensity of vertex B.

FIG. 28A is a diagram illustrating the dependence of near-field light intensity on the wavelength of the excitation light, at vertex A, in Example 1, Example 2, Comparative Example 1 and Comparative Example 2. FIG. 28B is a diagram illustrating the results of the near-field light intensity illustrated in FIG. 27A, normalized to the near-field light emission intensity of vertex B.

As illustrated in FIG. 28A and FIG. 28B, the excitation light wavelength for which the near-field light intensity at vertex A exhibits a peak was 800 nm in Example 1, Example 2, Comparative Example 1 and Comparative Example 2. The excitation light wavelengths for which the normalized intensity of near-field light generated at vertex A exhibits a peak were 700 nm, 700 nm, 650 nm and 700 nm for Example 1, Example 2, Comparative Example 1 and Comparative Example 2, respectively. These results indicated that the excitation light wavelengths for which the near-field light intensity generated at the sharpest vertex A exhibits a peak, and the excitation light wavelengths for which the normalized intensity of near-field light generated at vertex A exhibits a peak, are substantially independent from the shape (for instance, angle of the vertices) of the plasmon antenna, and from the surface area of the plan-view shape of the plasmon antenna.

An explanation follows next on examples and comparative examples in which the material of the plasmon antenna was Ag.

FIG. 29 illustrates the shape conditions of the plasmon antennas of Example 3, Example 4, Comparative Example 3 and Comparative Example 4. Example 3, Example 4, Comparative Example 3 and Comparative Example 4 are identical to Example 1, Example 2, Comparative Example 1 and Comparative Example 2 in FIG. 19, except that now the material of the plasmon antenna is Ag. The plan-view shapes of the plasmon antennas in Example 3, Example 4, Comparative Example 3 and Comparative Example 4 satisfy the relationship $C_3 > S_3 > S_4 = C_4$, wherein $S_3$, $S_4$, $C_3$, and $C_4$ are the respective surface areas of the plan-view shapes of the plasmon antennas. The explanation of Example 3, Example 4, Comparative Example 3 and Comparative Example 4 is identical to that of Example 1, Example 2, Comparative Example 1 and Comparative Example 2 (where the material of the plasmon antennas is Au).

Figure 30:
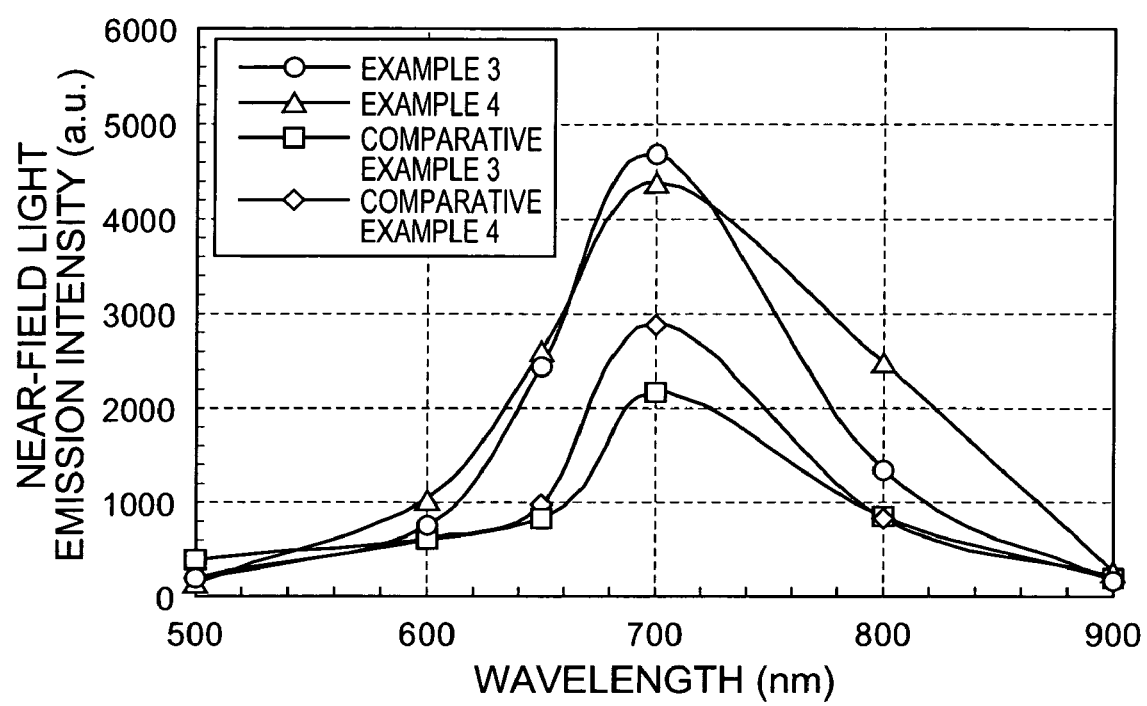
FIG. 30 is a diagram illustrating the dependence of near-field light intensity on the wavelength of the excitation light, at vertex A, in Example 3, Example 4, Comparative Example 3 and Comparative Example 4.

FIG. 30 is a diagram illustrating the dependence of near-field light intensity on the wavelength of the excitation light, at vertex A, in Example 3, Example 4, Comparative Example 3 and Comparative Example 4. Compared with FIG. 28A, which depicts the results for Example 1, Example 2, Comparative Example 1 and Comparative Example 2, the excitation light wavelength for which the near-field light intensity at vertex A exhibits a peak is 700 nm in FIG. 30. In Example 4, which has a greater degree of asymmetry than Example 3, the near-field light emission intensity generated at vertex A is weak when the wavelength of the excitation light is 700 nm, which is at variance with the result in FIG. 28A. Otherwise, however, FIG. 30 and FIG. 28A illustrate the same trend. It was thus shown that using Au and using Ag as the material comprised in the plasmon antenna results in the same trends as regards emission characteristics of near-field light.

In Examples 1 to 4 and Comparative Examples 1 to 4, the angle $\alpha$ of the plasmon antennas was 30 degrees in all cases. The simulations in Examples 5 to 24 and Comparative Examples 5 to 10, on the other hand, involved modifying $\alpha$, to ascertain, among other things, whether results identical to those of Examples 1 to 4 and Comparative Examples 1 to 4 were obtained.

As the magnetic recording medium for perpendicular magnetic recording there was used a magnetic recording medium obtained by sequentially stacking, on a glass substrate, a soft magnetic underlayer comprising a CoFe layer (25 nm)/Ru layer (1 nm)/CoFe layer (25 nm), a Ru layer (10 to 20 nm), a CoCrPt recording layer (20 to 30 nm), and a DLC (diamond-like carbon) protective layer. In the simulations, the distance between the magnetic recording medium and the plasmon antenna was 8 nm, the optical spot size of the near-field light irradiated from the plasmon antenna onto the magnetic recording medium was 20 nm, the size of the magnetic recording medium was 3.5 inches, and the revolutions of the magnetic recording medium were 7200 rpm. It is estimated that, under the above conditions, the plasmon antenna can be effectively used for thermally assisted magnetic recording if the near-field light emission intensity irradiated from the plasmon antenna is 750 $(V/m)^2$.

FIG. 31 illustrates the near-field light emission intensity generated at vertex A and the shape conditions of the plasmon antennas in Example 1, Example 2, Examples 5 to 7, Comparative Example 1 and Comparative Example 5.

In Example 1, Example 2, Examples 5 to 7, Comparative Example 1 and Comparative Example 5, the material was Au and the length of side AB was 150 nm, as illustrated in FIG. 31. In Comparative Example 5, Example 5 and Example 6 the angle $\alpha$ was 20 degrees. In Comparative Example 5, Example 5 and Example 6 the angle $\beta$ was 80 degrees, 75 degrees and 70 degrees, respectively. The plasmon antenna of Comparative Example 5 corresponds to FIG. 18A.

In Comparative Example 1, Example 1, Example 2 and Example 7 the angle $\alpha$ was 30 degrees. In Comparative Example 1, Example 1, Example 2 and Example 7 the angle $\beta$ was 75 degrees, 70 degrees, 65 degrees and 60 degrees, respectively. The plasmon antenna of Comparative Example 1 corresponds to FIG. 18A. Excitation light having a wavelength of 800 nm was irradiated onto the plasmon antennas of Example 1, Example 2, Examples 5 to 7, Comparative Example 1 and Comparative Example 5.

FIG. 32 illustrates the near-field light emission intensity generated at vertex A and the shape conditions of the plasmon antennas in Examples 8 to 14 and Comparative Examples 6 and 7.

In Examples 8 to 14 and Comparative Examples 6 and 7, the material was Au and the length of side AB was 150 nm, as illustrated in FIG. 32. In Comparative Example 6 and Examples 8 to 12 the angle α was 45 degrees. In Comparative Example 6 and Examples 8 to 12 the angle β was 67.5 degrees, 65 degrees, 60 degrees, 55 degrees, 50 degrees and 45 degrees, respectively. The plasmon antenna of Comparative Example 6 corresponds to FIG. 18A.

In Comparative Example 7 and Examples 13 and 14 the angle α was 55 degrees. In Comparative Example 7 and Examples 13 and 14 the angle β was 62.5 degrees, 60 degrees and 55 degrees, respectively. The plasmon antenna of Comparative Example 7 corresponds to FIG. 18A. Excitation light having a wavelength of 800 nm was irradiated onto the plasmon antennas of Examples 8 to 14 and Comparative Examples 6 and 7.

FIG. 33 illustrates the near-field light emission intensity generated at vertex A and the shape conditions of the plasmon antenna for Example 3, Example 4, Examples 15 to 17, Comparative Example 3 and Comparative Example 8. The plasmon antennas of Example 3, Example 4, Examples 15 to 17, Comparative Example 3 and Comparative Example 8 have the same shapes as those in Example 1, Example 2, Examples 5 to 7, Comparative Example 1 and Comparative Example 5 illustrated in FIG. 31, respectively, but with Ag as the material of the plasmon antennas. Excitation light having a wavelength of 700 nm was irradiated onto the plasmon antennas of Example 3, Example 4, Examples 15 to 17, Comparative Example 3 and Comparative Example 8.

FIG. 34 illustrates the near-field light emission intensity generated at vertex A and the shape conditions of the plasmon antennas in Examples 18 to 24 and Comparative Examples 9 and 10. The plasmon antennas of Examples 18 to 24 and Comparative Examples 9 and 10 have shapes identical to those of Examples 8 to 14 and Comparative Examples 6 and 7 illustrated in FIG. 32, respectively, but with Ag as the material of the plasmon antennas. Excitation light having a wavelength of 700 nm was irradiated onto the plasmon antennas of Examples 18 to 24 and Comparative Examples 9 to 10.

Figure 35:
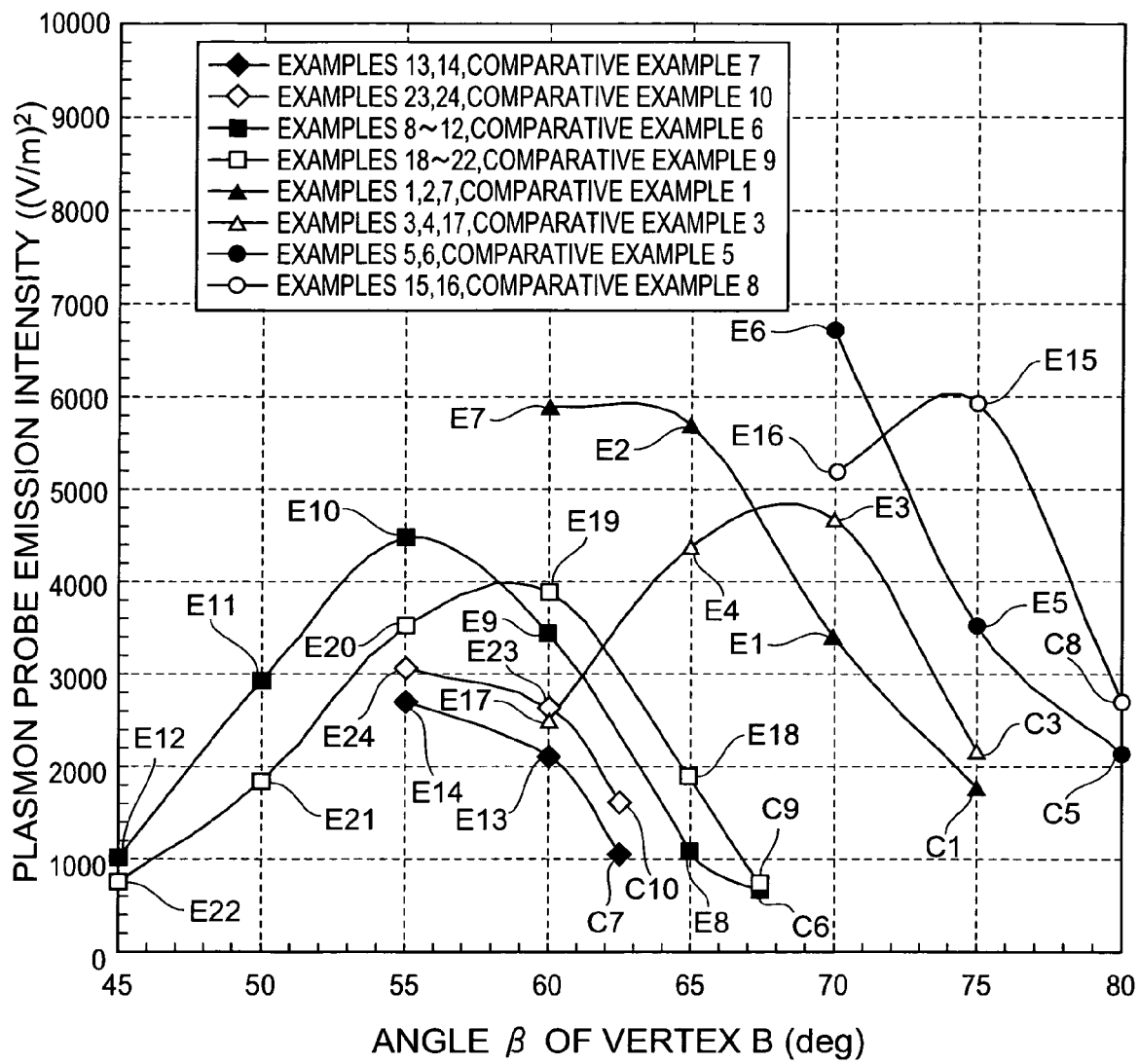
FIG. 35 is a diagram illustrating the results of the examples and comparative examples of FIG. 31 to FIG. 34, in which the horizontal axis represents the interior angle β of vertex B and the vertical axis represents near-field light intensity at vertex A.

FIG. 35 is a diagram illustrating the results of the examples and comparative examples of FIG. 31 to FIG. 34, with the horizontal axis representing the interior angle β of vertex B and the vertical axis representing near-field light intensity at vertex A. In the plots of FIG. 35, "E" denotes "Example" and the numerals denote the example number, while "C" denotes "Comparative Example" and the numerals denote the comparative example number. The examples and comparative examples in which the material of the plasmon antenna is Au are represented by black plots, while the examples and comparative examples in which the material of the plasmon antenna is Ag are represented by white plots. In FIG. 35, moreover, the plots of examples and comparative examples having the same size of angle α and the same plasmon antenna material are joined by respective lines. Specifically, the following sets of examples and comparative examples are joined by lines.

Example 6-Example 5-Comparative Example 5 (α=20 degrees, material Au)

Example 16-Example 15-Comparative Example 8 (α=20 degrees, material Ag)

Example 7-Example 2-Example 1-Comparative Example 1 (α=30 degrees, material Au)

Example 17-Example 4-Example 3-Comparative Example 3 (α=30 degrees, material Ag)

Example 12-Example 11-Example 10-Example 9-Example 8-Comparative Example 8 (α=45 degrees, material Au)

Example 22-Example 21-Example 20-Example 19-Example 18-Comparative Example 6 (α=45 degrees, material Ag)

Example 14-Example 13-Comparative Example 7 (α=55 degrees, material Au)

Example 24-Example 23-Comparative Example 10 (α=55 degrees, material Ag)

In FIG. 35, the plots of Comparative Examples 1, 3 and 5 to 10, in which the plan-view shape of the plasmon antenna is symmetrical as viewed from a direction perpendicular to the medium-facing surface S, i.e. as viewed from the Z-axis direction, are each the rightmost plot in the respective sets of plots joined by lines. Upon comparison of data for cases having the same interior angle α of vertex A, it was found that the near-field light emission intensity generated at vertex A in Examples 1 to 24 was stronger than in Comparative Examples 1, 3 and 5 to 10, as illustrated in FIG. 35. This showed that the near-field light emission intensity generated at vertex A became stronger when the plan-view shape of the plasmon antenna satisfies the relationship ($\alpha<\beta$, $\alpha<\gamma$ and $\beta\neq\gamma$) than when the plan-view shape of the plasmon antenna satisfies the relationship ($\alpha<\beta$, $\alpha<\gamma$, and $\beta=\gamma$) (that is, when the plan-view shape of the plasmon antenna is asymmetrical rather than when it is symmetrical).

In a comparison of cases having identical α, Examples 1 to 24, in which α is 20, 30, 45 or 55 degrees, exhibited stronger near-field light emission intensity generated at vertex A than all Comparative Examples 1, 3 and 5 to 10. This indicates that α satisfies preferably 20 degrees$\leq\alpha\leq$55 degrees.

Focusing on the set comprising Example 6-Example 5-Comparative Example 5 (α=20 degrees, material Au) in FIG. 35, the near-field light emission intensity generated at vertex A is stronger in Example 6 and Example 5 than in Comparative Example 5. This indicated that, preferably, the material of the plasmon antenna is Au, and the plan-view shape of the plasmon antenna satisfies, in addition to the relationship ($\alpha<\beta$, $\alpha<\gamma$ and $\beta\neq\gamma$), also the relationship (15 degrees$\leq\alpha\leq$25 degrees and 70 degrees$\leq\beta<$80 degrees).

Focusing on the set comprising Example 16-Example 15-Comparative Example 8 (α=20 degrees, material Ag) in FIG. 35, the near-field light emission intensity generated at vertex A is stronger in Example 16 and Example 15 than in Comparative Example 8. This indicated that, preferably, the material of the plasmon antenna is Ag, and the plan-view shape of the plasmon antenna satisfies, in addition to the relationship ($\alpha<\beta$, $\alpha<\gamma$ and $\beta\neq\gamma$), also the relationship (15 degrees$\leq\alpha\leq$25 degrees and 70 degrees$\leq\beta<$80 degrees).

Focusing on the set comprising Example 7-Example 2-Example 1-Comparative Example 1 (α=30 degrees, material Au) in FIG. 35, the near-field light emission intensity generated at vertex A is stronger in Example 7, Example 2 and Example 1 than in Comparative Example 1. This indicated that, preferably, the material of the plasmon antenna is Au, and the plan-view shape of the plasmon antenna satisfies, in addition to the relationship ($\alpha<\beta$, $\alpha<\gamma$ and $\beta\neq\gamma$), also the relationship (25 degrees$\leq\alpha\leq$35 degrees and 60 degrees$\leq\beta<$75 degrees).

Focusing on the set comprising Example 17-Example 4-Example 3-Comparative Example 3 (α=30 degrees, material Ag) in FIG. 35, the near-field light emission intensity generated at vertex A is stronger in Example 17, Example 4 and Example 3 than in Comparative Example 3. This indicated that, preferably, the material of the plasmon antenna is Ag, and the plan-view shape of the plasmon antenna satisfies, in addition to the relationship ($\alpha<\beta$, $\alpha<\gamma$ and $\beta\neq\gamma$), also the relationship (25 degrees$\leq\alpha\leq$35 degrees and 60 degrees$\leq\beta<$75 degrees).

Focusing on the set comprising Example 12-Example 11-Example 10-Example 9-Example 8-Comparative Example 8 ($\alpha$=45 degrees, material Au) in FIG. 35, the near-field light emission intensity generated at vertex A is stronger in Example 12, Example 11, Example 10, Example 9 and Example 8 than in Comparative Example 8. This indicated that, preferably, the material of the plasmon antenna is Au, and the plan-view shape of the plasmon antenna satisfies, in addition to the relationship ($\alpha<\beta$, $\alpha<\gamma$ and $\beta\neq\gamma$), also the relationship (40 degrees$\leq\alpha\leq$50 degrees and 45 degrees$\leq\beta<$67.5 degrees).

Focusing on the set comprising Example 22-Example 21-Example 20-Example 19-Example 18-Comparative Example 6 ($\alpha$=45 degrees, material Ag) in FIG. 35, the near-field light emission intensity generated at vertex A is stronger in Example 22, Example 21, Example 20, Example 19 and Example 18 than in Comparative Example 6. This indicated that, preferably, the material of the plasmon antenna is Ag, and the plan-view shape of the plasmon antenna satisfies, in addition to the relationship ($\alpha<\beta$, $\alpha<\gamma$ and $\beta\neq\gamma$), also the relationship (40 degrees$\leq\alpha\leq$50 degrees and 45 degrees$\leq\beta<$67.5 degrees).

Focusing on the set comprising Example 14-Example 13-Comparative Example 7 ($\alpha$=55 degrees, material Au) in FIG. 35, the near-field light emission intensity generated at vertex A is stronger in Example 14 and Example 13 is stronger than in Comparative Example 7. This indicated that, preferably, the material of the plasmon antenna is Au, and the plan-view shape of the plasmon antenna satisfies, in addition to the relationship ($\alpha<\beta$, $\alpha<\gamma$ and $\beta\neq\gamma$), also the relationship (50 degrees $\leq\alpha\leq$60 degrees and 55 degrees $\leq\beta<$62.5 degrees).

Focusing on the set comprising Example 24-Example 23-Comparative Example 10 ($\alpha$=55 degrees, material Ag) in FIG. 35, the near-field light emission intensity generated at vertex A is stronger in Example 24 and Example 23 is stronger than in Comparative Example 10. This indicated that, preferably, the material of the plasmon antenna is Ag, and the plan-view shape of the plasmon antenna satisfies, in addition to the relationship ($\alpha<\beta$, $\alpha<\gamma$ and $\beta\neq\gamma$), also the relationship (50 degrees$\leq\alpha\leq$60 degrees and 55 degrees$\leq\beta<$62.5 degrees).

It is estimated that the plasmon antenna can be effectively used for thermally assisted magnetic recording if the near-field light emission intensity irradiated from the plasmon antenna is at least 750 (V/m)$^2$ under the present simulation conditions, which may vary depending on the specifications of the magnetic disk that comprises the magnetic recording medium.

Upon comparison, it was found that forming the plasmon antenna using Au and using Ag elicited virtually the same effect. This indicates that the material used of forming the plasmon antenna is preferably Au or Ag.

What is claimed is:

1. A thermally assisted magnetic head, comprising:
   a medium-facing surface;
   a main magnetic pole provided on the medium-facing surface;
   a plasmon antenna provided on the medium-facing surface, in the vicinity of the main magnetic pole, wherein
   the shape of the plasmon antenna, as viewed from a direction perpendicular to the medium-facing surface, is a triangle having first, second and third corners, the plasmon antenna being shaped as a flat plate the thickness direction of which is perpendicular to the medium-facing surface, and wherein,
   the distance from the first corner to the main magnetic pole is shorter than the distance from the second corner to the main magnetic pole and the distance from the third corner to the main magnetic pole, and
   the interior angle $\alpha$ of the first corner, the interior angle $\beta$ of the second corner and the interior angle $\gamma$ of the third corner satisfy relationships $\alpha<\beta$, $\alpha<\gamma$ and $\beta\neq\gamma$.

2. The thermally assisted magnetic head according to claim 1, wherein the plasmon antenna satisfies the relationship 20 degrees $\leq\alpha\leq$55 degrees.

3. The thermally assisted magnetic head according to claim 1, wherein the plasmon antenna comprises gold or silver.

4. A head gimbal assembly, comprising:
   the thermally assisted magnetic head according to claim 1; and
   a suspension onto which the thermally assisted magnetic head is mounted.

5. A hard disk drive, comprising:
   the head gimbal assembly according to claim 4; and
   a magnetic recording medium facing the medium-facing surface.

6. A method for manufacturing a thermally assisted magnetic head having a plasmon antenna shaped as a triangular flat plate as viewed from a direction perpendicular to a medium-facing surface, comprising the steps of:
   forming a metal layer to be the plasmon antenna on an insulating layer;
   forming a first mask layer on part of a stacking surface of the metal layer and etching a region of the stacking surface of the metal layer that is not masked by the first mask layer, to form thereby, in the metal layer, a first inclined surface extending from the stacking surface to the insulating layer;
   forming a second mask layer on the first inclined surface and the stacking surface of the metal layer, and etching the second mask layer to remove the second mask layer from the stacking surface of the metal layer, leaving the second mask layer remained on the first inclined surface; and
   forming on the metal layer a second inclined surface extending from the first inclined surface to the insulating layer and defining, with the first inclined surface, an interior angle $\alpha$ of a first corner of the plasmon antenna, by further etching the metal layer, using as a mask the second mask layer remained on the first inclined surface, wherein
   the first inclined surface and the stacking surface of the insulating layer define an interior angle $\beta$ of a second corner of the plasmon antenna;
   the second inclined surface and the stacking surface of the insulating layer define an interior angle $\gamma$ of a third corner of the plasmon antenna, and
   relationships $\alpha<\beta$, $\alpha<\gamma$ and $\beta\neq\gamma$ are satisfied.

7. The method for manufacturing a thermally assisted magnetic head according to claim 6, wherein etching of the second mask layer is performed by dry etching while rotating a substrate on which the metal layer to be the plasmon antenna is formed.

* * * * *